US006538749B1

(12) United States Patent
Takata et al.

(10) Patent No.: US 6,538,749 B1
(45) Date of Patent: Mar. 25, 2003

(54) METHOD AND APPARATUS FOR EVALUATING ABERRATIONS OF OPTICAL ELEMENT FOR USE WITH OPTICAL DEVICE BY USING PHASE DIFFERENCES DETERMINED BY OVERLAPPING TWO DIFFRACTED LIGHTS TO FORM A SHARING IMAGE

(75) Inventors: Kazumasa Takata, Moriguchi (JP); Masahiro Nakajo, Hirakata (JP); Kanji Nishii, Osaka (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/361,143

(22) Filed: Jul. 27, 1999

(30) Foreign Application Priority Data

Jul. 27, 1998 (JP) .......................................... 10-210985

(51) Int. Cl.[7] ................................................ G01B 9/02
(52) U.S. Cl. ........................ 356/520; 356/521; 356/515
(58) Field of Search .................................. 356/515, 521

(56) References Cited

U.S. PATENT DOCUMENTS 3,829,219 A * 8/1974 Wyant .......................... 356/515

4,707,137 A * 11/1987 Lee .............................. 356/520

FOREIGN PATENT DOCUMENTS

JP        02000214048 A  *  8/2000

* cited by examiner

Primary Examiner—Samuel A. Turner
(74) Attorney, Agent, or Firm—Wenderoth, Lind & Ponack, L.L.P.

(57) ABSTRACT

A method for evaluating aberrations of an optical element such as optical head for use with an optical system such as DVD. In this method, light is transmitted through the optical element and then diffracted into 0, ±1, ±2, . . . order diffraction lights, for example. Among others, first and second lights (e.g., 0 and +1, 0 and −1, +1 and −1, or 0 and ±1 order diffracted lights) are overlapped to form an image shared by the first and second lights. Then, light intensity at first and second points in the shared image are detected. At this moment, light intensity at the first and second points are changed. Then, a phase difference in light intensity of between first and second points is determined. Using the phase difference, aberrations of the optical element are determined.

16 Claims, 19 Drawing Sheets

$\theta = 0°$ $\theta = 45°$ $\theta = 90°$ $\theta = 0°$ $\theta = 45°$ $\theta = 90°$ $\theta = 0°$ $\theta = 45°$ $\theta = 90°$

METHOD AND APPARATUS FOR EVALUATING ABERRATIONS OF OPTICAL ELEMENT FOR USE WITH OPTICAL DEVICE BY USING PHASE DIFFERENCES DETERMINED BY OVERLAPPING TWO DIFFRACTED LIGHTS TO FORM A SHARING IMAGE

FIELD OF THE INVENTION

The present invention relates to a method and apparatus for evaluating aberrations of an optical element such as optical head preferably for use with an optical playing/recording system.

BACKGROUND OF THE INVENTION

Typically, a conventional method for evaluating aberrations of an optical element needs two steps; a first step for reconstructing an original wavefront from a shared pattern of two divided images and a second step for determining several aberrations individually from the reconstructed wavefront.

Specifically, FIG. 19 shows a conventional system generally indicated by reference numeral 300 for determining aberrations of an optical element 302. In determining aberrations of an optical element, light from the optical element 302 is transmitted into a first beam splitter 304 where it is divided into first and second lights 306 and 308. The first light 306 passed through the first beam splitter 304 is reflected at a first mirror 310 and then transmitted through a second beam splitter 312 into an image receiver 314. The second light 308 reflected by the first beam splitter 304 is reflected by a second mirror 316 and the second beam splitter 312 into the image receiver 314. The second mirror 316 is positioned so that the first and second lights 306 and 308 are shifted from the other on the image receiver 314 to form a sharing image or pattern thereon. The sharing image or pattern is then analyzed at an image processor 316 to determine aberrations of the optical element.

With this arrangement, the original wavefront is determined from the sharing image or pattern, which requires many steps for evaluating the aberrations and therefore is time consuming. Also needed is an analysis of second order matrix, which requires a great number of calculations. Likewise, a calculation for determining the original wavefront from the sharing image requires a great number of steps and therefore is also time consuming. Further, the light is divided into two and then the divided two light must be overlapped on the image receiver 314 with a great precision, which requires the respective light paths to be held positively and therefore renders the arrangement so bulky.

FIG. 20 shows another conventional system generally indicated by reference numeral 318 for evaluating aberrations of an optical element 320 to be adjusted. With the system 318, light 322 is transmitted through an objective lens 324 of the optical element 320 to a transparent plate 326. The light 322 is then focused by a collecting lens 328 as a light spot on an image receiver 330 which forms a series of signals corresponding to the received image. The signals are then transmitted to a signal processor 332 where a distribution of light intensity in the received image is determined. The distribution of the light intensity is used for determining aberrations of the optical element 320, and the determined aberrations are in turn used for adjusting the optical element 320.

In this instance, however, the focused light spot should be greatly magnified and therefore a field of view of the image receiver 328 is so narrow. This means that even a small translation of the image spot would cause the light spot to move out of the field of view of the image receiver, which fails to detect the aberrations. Also, the spot light includes no phase information, which makes it difficult to obtain aberrations precisely.

SUMMARY OF THE INVENTION

Therefore, an object of the present invention is to provide an improved method and apparatus capable of determining aberrations of an optical element easily.

For the purpose, according to a method for evaluating an aberration of an optical element, light is transmitted through the optical element and then diffracted into 0, ±1, ±2, . . . order diffraction lights, for example. Among others, first and second lights (e.g., 0 and +1, 0 and −1, +1 and −1, or 0 and ±1 order diffracted lights) are overlapped to form an image shared by the first and second lights. Then, light intensity at first and second points in the shared image are detected. At this moment, light intensity at the first and second points are changed. Then, a phase difference in light intensity of between first and second points is determined. Using the phase difference, aberrations of the optical element are determined.

In another aspect of the present invention, a plurality of points are determined in the shared region. Specifically, determined are first to seventh points. The first is a mid-center of a first line connecting axes of the first and second diffracted lights. The second point is located on a second line crossing the first line at the first point. The third point is located on the second line so that second and third points are positioned symmetrically with respect to the first line. The fourth and fifth points are located on the second line and symmetrically on opposite sides of the first line so that each of fourth and fifth points is spaced a distance from the first line. Sixth and seventh points are located on opposite sides of the first line so that each of sixth and seventh points is spaced the distance from the first line.

In another aspect of the present invention, the method includes steps for determining comma of the optical element. To this end, a first phase difference Ph(1) in light intensity of between first and second points is determined. Likewise, a second phase difference Ph(2) in light intensity of between second and third points, a third phase difference Ph(3) in light intensity of between fourth and fifth points, a fourth phase difference Ph(4) in light intensity of between sixth and seventh points are determined. Using such phase differences, a magnitude of comma is determined by a phase difference obtained from the following equation:

Phase difference=|Ph(1)|−|Ph(2)|/2

Also, a direction of comma is determined using a phase difference obtained by the following equation:

Phase difference=|Ph(4)|−|Ph(3)|

In another aspect of the present invention, astigmatism of the optical element is determined. In this determination, a diffraction grating is directed in three directions. For each direction, light is transmitted through the optical element and then guided into a diffraction grating to obtain first and second diffracted lights. The first and second diffracted lights are overlapped each other to form a shared image. Then, an intensity of light are determined at first and second points in the shared image. The first and second points are located on a line crossing a mid-center of another line connecting centers of the first and second diffracted lights and symmetrically with respect to another line. At this moment, light intensity is changed. Further, a phase difference in light intensity of between first and second points is determined, which is used for evaluating an astigmatism of the optical element.

An apparatus for evaluating an, aberration an optical element has a reflection type or transmission type of diffraction grating. The grating is formed with a is plurality of parallel grooves so that light from the optical element is diffracted into diffraction lights. The diffraction lights include first and second lights partially overlapped to form a shared image. A mechanism is provided for moving the diffraction grating in a direction substantially perpendicular to an axis of the light. The sharing image is then received by an image receiver. A phase of light intensity at each of plural points in the shared image is determined and then used for evaluating aberrations.

Another apparatus for evaluating an aberration an optical element includes a pair of first and second transmission type of diffraction gratings. Each of first and second gratings is formed with parallel slits to diffract light into diffraction lights rather than zero order diffraction light. The first and second diffraction gratings are positioned parallel to each other with the slits directed in one direction to form a shared image in which two diffracted images are partially overlapped. A mechanism is provided for moving the first diffraction grating in another direction that forms a certain angle with the one direction. Also, provided are an image receiver for receiving the shared image and a processor for determining a phase of light intensity at each of plural points in the shared image.

In addition, an apparatus for correcting an aberration an optical element includes a mechanism for correcting aberration of the optical element.

DETAILED DESCRIPTION OF THE PREFERRED EMBODIMENTS

With reference to the drawings, preferred embodiments of the present invention will be described hereinafter.

(I) FIRST EMBODIMENT

Figure 1:
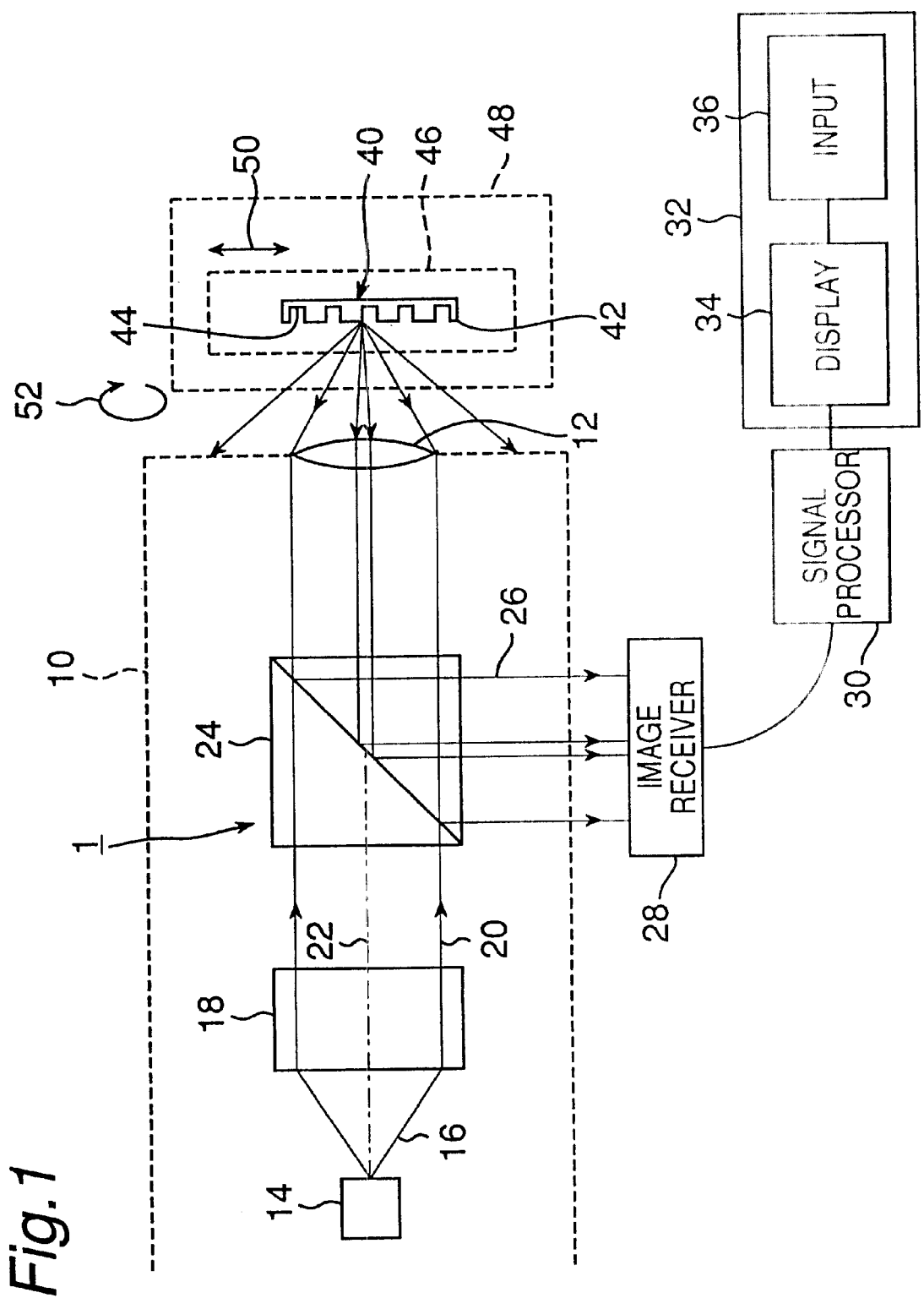
FIG. 1 shows a system for evaluating aberrations of an optical element of the first embodiment according to the present invention.

FIG. 1 illustrates an optical system of the first embodiment according to the present invention, generally indicated by reference numeral 1, for evaluating various aberrations of an optical element. For this purpose, the system 1 includes an optical device generally indicated by reference numeral 10. The device 10, which may be an optical assembly or optical head to be incorporated in an optical recording and/or playing system such as digital-video-disc play system, is equipped with an optical element or lens 12 supported by a suitable support not shown. The device 10 further includes a light source 14 for emitting light 16. Preferably, the light source 14 may be a laser system for generating and then emitting laser. A modulator 18 made of a series of optical elements, for example, is provided for modulating light 16 into collimated light 20 which is then transmitted along an optical axis 22 of the lens 12. Provided on the optical axis 22 and between the modulator 18 and the lens 12 is a beam splitter 24.

The beam splitter 24 allows the collimated light to travel therethrough into the lens 12, while it causes another light 26 travelling in the opposite direction from the lens 12 into the beam splitter 24 to direct toward another direction perpendicular to the collimated light 20.

To receive the light 26 reflected by the beam splitter 24, the system 1 includes an image receiver 28 preferably made of a number of light receiving elements in a charge-coupled-device (CCD), each of which transforms the received image into a series of image signals. The image receiver 28 is electrically communicated with a signal processor 30, which is in turn communicated with an image display unit 32 equipped with a display 34 such as CRT and LCD so that the image received by the image receiver 28 is reproduced on the display 34. Preferably, the display unit 32 is communicated with an input device 36 such as keyboard and mouse for drawing lines on the displayed image and also identifying points in the displayed image.

In addition, the system 1 includes a reflection type of diffraction grating 40 having a planar surface 42 in which a number of small grooves 44 are formed in a parallel fashion. The grating 40 may be a part of an optical disk to be replayed by the device 10. To allow the surface 42 to reflect light, it is coated with a reflective thin film made of suitable metal.

The grating 40 is supported by a suitable support 46 so that the surface 42 opposes to the lens 12 leaving a certain small gap. The gap should be determined so that it allows the lens 12 to focus the collimated light 20 precisely on the surface 42 of the grating 40.

The grating support 46 as well as the grating 40 is drivingly connected with a suitable drive mechanism 48 so that it can travel back and forth in a reference direction indicated by an arrow 50, perpendicular to the lens axis 22 and also rotate about the lens axis 22 in a direction indicated by an arrow 52, relative to lens 12.

It should be noted that if the device 1 is only to evaluate the aberrations of the lens 12, it can be designed that the lens 12 is replaceable. If, on the other hand, the device 10 is to be incorporated in the optical system such as DVD, it can be releasably mounted in the system 1 for evaluating the aberrations of the optical device 10.

In operation of the system 1 so constructed, the grating 40 is positioned and fixed on the grating support 46. Subsequently, the drive mechanism 48 is energized, so that the grating 40 is transported in the direction 50, during which the light source 14 emits light 16 which is then modulated at the modulator 18 into collimated light 20. The collimated light 20 is then transmitted through the beam splitter 24 and further to the lens 12 where it is focused on the grooves 38 moving past the focal point of the lens 12. The focused light is diffracted at the grooves 38 and reflected back toward the lens 12.

The reflected light includes 0, ±1, ±2, . . . order diffraction lights. In this embodiment, a diffraction angle of the grating 40 is designed so that, among others, only 0 and +1 order diffracted lights can travel into the lens 12 and share a part of an opening or pupil of the lens 12. As is well known to ones skilled in the art, the diffraction angle can be determined by a wavelength of the incident light and a pitch or interval of the grooves 44.

The 0 and +1 order diffracted lights interfere with each other to form an interference fringes or sharing pattern which reflects various aberrations included in the lens 12, which will be described in detail hereinafter. The 0 and +1 order diffracted lights are then collimated at the lens 12 and then reflected by the beam splitter 24 into the light receiver 28. The light receiver 28 generates signals corresponding to the received image. The signals are then transmitted to the signal processor 30 where they are processed into signals of an image to be displayed on the display 34.

Figure 2:
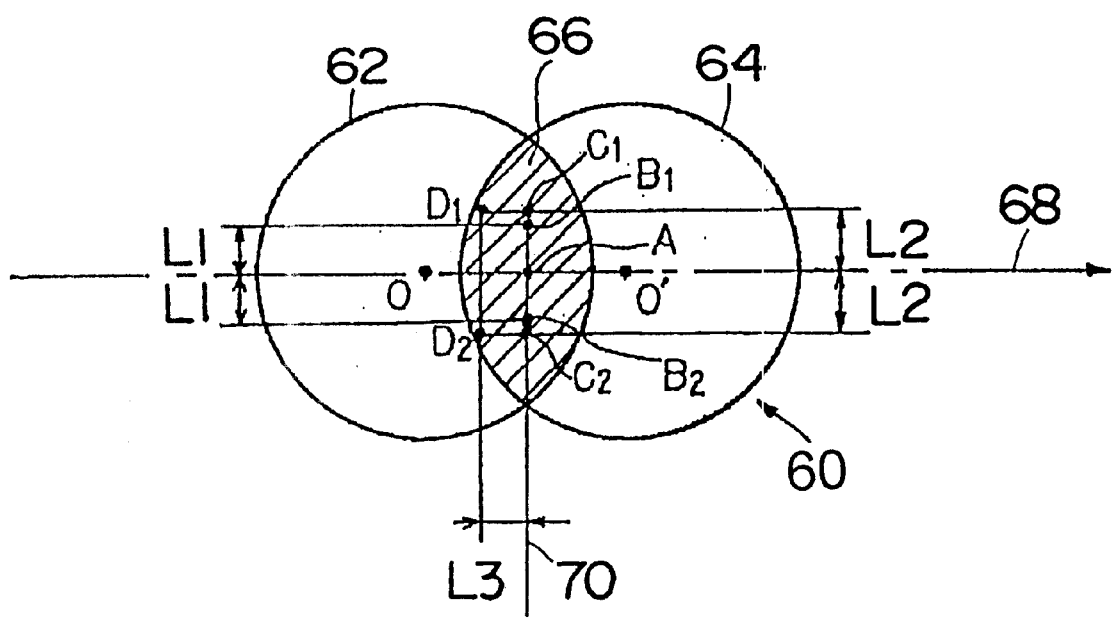
FIG. 2 shows a sharing image of two diffracted lights and points set in a shared region for determining a comma of the optical element.

FIG. 2 shows a typical image displayed on the display 34. The displayed image includes a sharing pattern 60, made of 0 and +1 order diffracted-light circle images, 62 and 64, partially overlapping each other to define a shared region 66. In this sharing pattern 60, alphabets (O) and (O') represent centers of the circle images 62 and 64, respectively. Also, a line indicated at 68 represents a sharing axis or sharing direction, and another line indicated at 70 represents a line or direction extending perpendicular to the sharing axis and crossing a mid-center of the circle centers (O) and (O'). Note that, by the rotation of the grating 40 with respect to the reference direction 50, the sharing pattern 60 together with the sharing axis 66 rotates on the display 34 as shown in FIGS. 3B and 3C, in which η2 and η3 indicate respective rotational angles of the sharing axis 68 with respect to the reference direction 50.

An intensity of light at any point in the shared region 66 varies as the grating 40 moves. Also, the variation of the light intensity at one point in the shared region 66 has a specific phase which is different from that at another point. Then, a phase difference in light intensity of between selected points is preferably used for evaluating the aberrations of the lens 12, which would be described hereinafter.

Next, discussions will be made to the evaluation of the aberrations of the device 10. As briefly described above, the aberrations are evaluated by detecting phase differences in light intensity at various selected points in the shared region 66. For determining phases of the light intensity, employed is a phase shift method in which light intensity is detected at predetermined points while the diffraction grating is moving in the reference direction. The phase shift method is described in detail in "Optical Shop Testing, ed. D. Malacara (John Wiley and Sons, New York, 1978), p.414", which is incorporated herein by reference.

For the better understanding of the evaluation of the aberrations according to the present invention, brief descriptions will be made to each of the aberrations to be handled according to the present invention. Specifically, FIGS. 4A to 7C show wavefronts including sharing patterns of defocusing, spherical aberration, comma, and astigmatism, respectively, caused by the sharing interference of the two diffracted images. Note that in those drawings, λ represents a phase of light received by the image receiver 28. Also, θ indicates an angle of between the sharing axis and the reference direction.

Figure 4A:
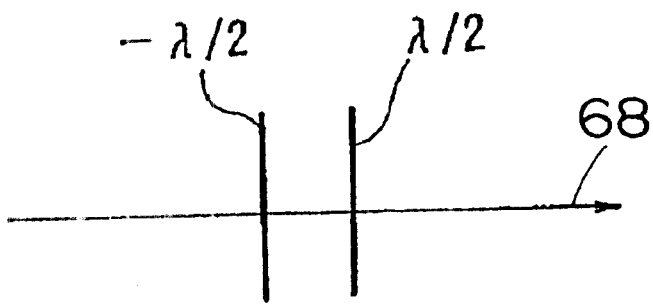
FIGS. 4A to 4C show wavefronts caused by defocusing.
Figure 4B:
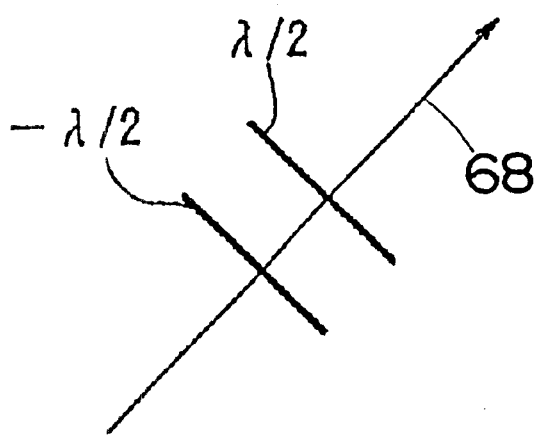
Figure 4C:
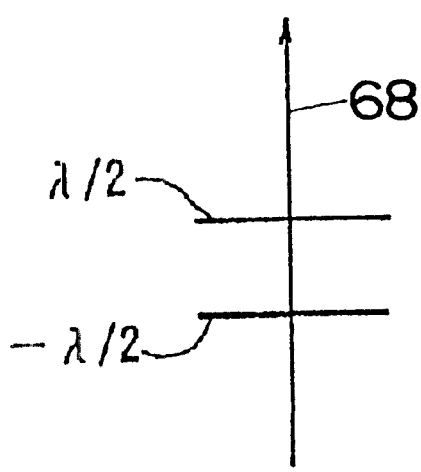

First, in FIGS. 4A to 4C, the wavefront of the defocusing including interference fringes shown by solid lines and caused by the defocusing is symmetrically represented with respect to the sharing axis. The wavefront due to the defocusing can be expressed in the ξ and η coordinates by the following equation (1):

$$\Phi_{defocus} = K(\xi^2 + \eta^2) \quad (1)$$

where:

$\Phi_{defocus}$: Function of wavefront due to defocusing

K: Constant

This equation suggests that interference fringes caused by the diffracted-image sharing extend perpendicular to the sharing axis. That is, a light intensity variation at one point on one side of the sharing axis has the same phase as that at another point symmetrically located on the opposite side of the sharing axis.

Figure 5A:
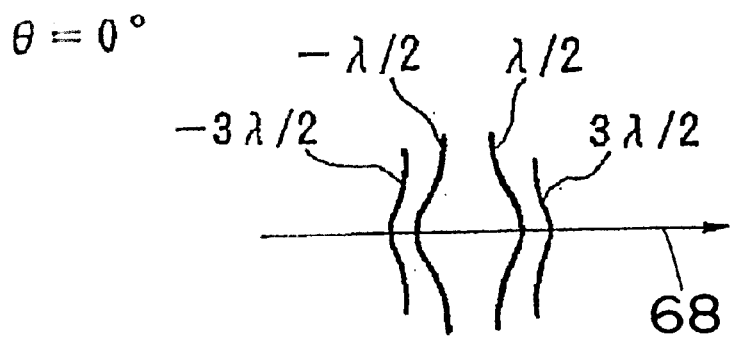
FIGS. 5A to 5C show wavefronts caused by a spherical aberration.
Figure 5B:
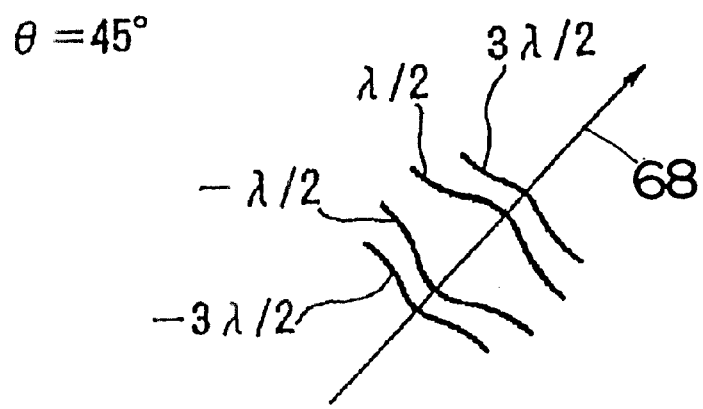
Figure 5C:
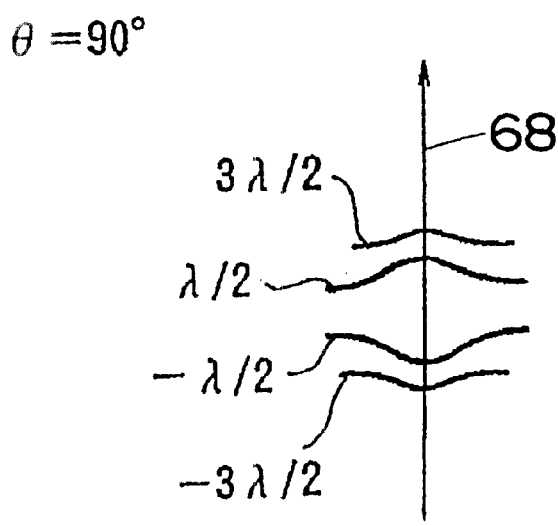

Next, as shown in FIGS. 5A to 5C, the wavefront including interference fringes shown by solid lines and caused by the spherical aberration is represented symmetrically with respect to the sharing axis. The wavefront due to the spherical aberration can be expressed in the ξ, η coordinates by the following equation (2):

$$\Phi_{spherical\ aberration} = Q(\xi^2 + \eta^2)^2 \quad (2)$$

where:

$\Phi_{spherical\ aberration}$: Function of wavefront due to spherical aberration Q: constant This equation suggests that the interference fringes caused by the spherical aberration exist symmetrically with respect to the sharing axis 68 and also with respect to the vertical line 70, irrelevant to the reference direction. Also, the spherical aberration causes no phase difference in light intensity of between two points on the vertical line 70. Likewise, no phase difference due to the spherical aberration exists between light intensity variations at two points located symmetrically with respect to the sharing axis 68.

Figure 6A:
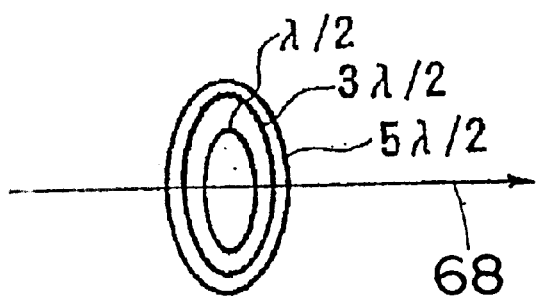
FIGS. 6A and 6C show wavefronts caused by the comma.
Figure 6B:
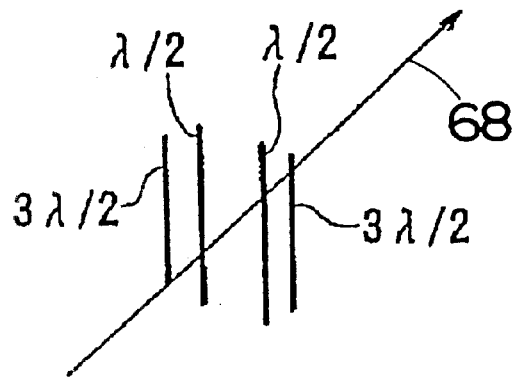
Figure 6C:
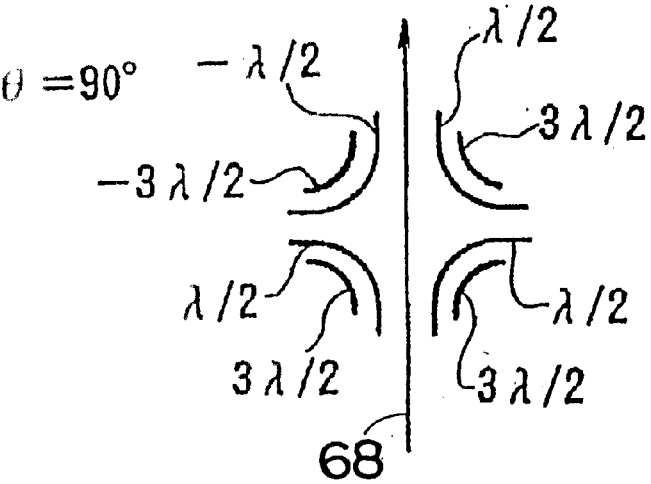

As shown in FIGS. 6A to 6C, the wavefront due to the comma can be expressed in the $\xi$, $\eta$ coordinates by the following equation (3):

$$\Phi_{comma} = R(\xi^2 + \eta^2)\eta \quad (3)$$

where:

$\Phi_{comma}$: Function of wavefront due to comma

R: Constant

This equation (3) means that the comma depends upon the direction $\eta$, which is referred to as "comma direction" hereinafter as necessary. Typically, the comma direction differs from the sharing direction 68. To determine the comma direction, the comma should be separated into two components; first comma component in the sharing direction 68 and the second comma component in the vertical direction 70. Then, magnitudes of the first and second comma components are determined, with which the comma direction is then determined by the vector analysis.

It is to be understood that, where the comma direction is identical to the sharing axis 68, as shown in FIG. 6A the interference fringes due to the comma are represented symmetrically with respect to the sharing axis 68. This means that the phase difference in light intensity of between two points located on the sharing axis 68 and located symmetrically with respect to the center of the symmetrical interference fringes depends only upon the second comma component. On the other hand, where the comma direction is vertical to the sharing direction 68, as shown in FIG. 6C the interference fringes due to the comma are represented symmetrically with respect to the sharing and vertical directions, 68 and 70. This means that the phase difference in light intensity of between two points located on the vertical line 70 depends only upon first comma component. For reference, FIG. 6B shows the interference fringes due to the comma when the sharing axis 68 is turned at 45 degrees with respect to the reference direction 70.

Figure 7A:
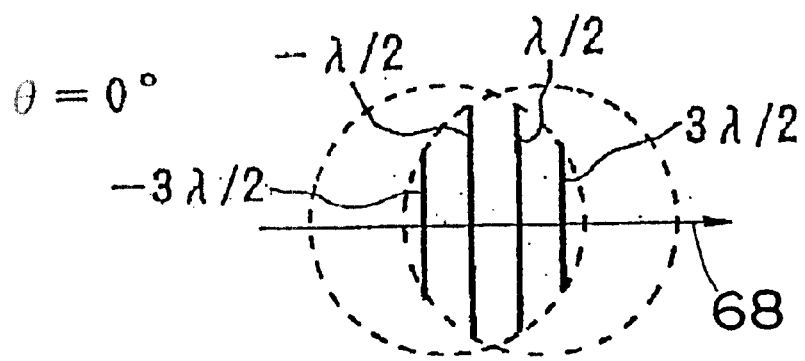
FIGS. 7A to 7C show wavefronts caused by the astigmatism.
Figure 7B:
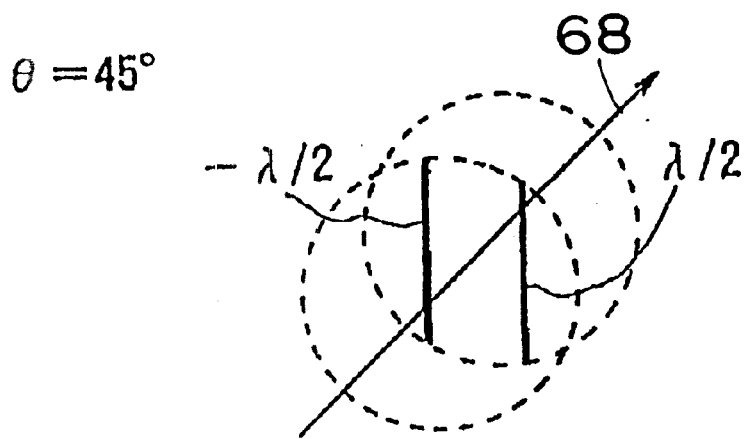
Figure 7C:
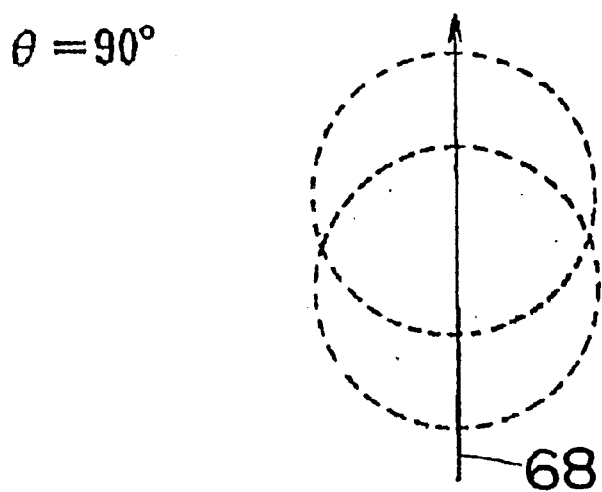

FIGS. 7A to 7C illustrate interference fringes caused by the astigmatism. It has been understood that the astigmatism is expressed in the $\eta$ coordinate by the following equation (4):

$$\Phi_{astigmatism} = S\eta^2 \quad (4)$$

where:

$\Phi_{astigmatism}$: Function of wavefront due to astigmatism

S: constant

This equation (4) means that the astigmatism depends only upon the direction $\eta$. Therefore, when the two diffracted images are shared in the direction $\xi$, no interference fringe would appear in the shared region as shown in FIG. 7C. Contrary to this, when the diffracted images are shared in another direction rather than $\xi$, interference fringes appears to extend parallel to the direction $\xi$ as shown in FIG. 7B. Also, when shared in the direction $\eta$, distances of the neighboring interference fringes are minimized as shown in FIG. 7A.

Next, referring again to FIG. 2, determinations of the comma and astigmatism will be described in detail herein after. For this purpose, several points are set within the shared region 66 of the sharing pattern 60. It should be noted that the point setting can be done using suitable input device 36 such as keyboard and mouse on the display. Specifically, points (B1) and (B2) are selected on the vertical line 70 on opposite sides of its mid-center (A) and also on the sharing axis 68, spacing a certain distance (L1) from the mid-center (A). Likewise, also determined are points (C1) and (C2) on the vertical line 70 on opposite sides of the mid-center (A), spacing a certain distance (L2) from the mid-center (A). It should be noted that, in this embodiment, (L1) differs from (L2); however, (L1) may be the same as (L2). In addition, another points (D1) and (D2) are determined symmetrically on opposite sides of the sharing axis. 68, leaving the distance (L2) from the sharing axis 68 and also on one side of the vertical line 70, leaving a distance (L3) from the vertical axis 70.

Then, at each of the set points (A), (B1), (B2), (C1), (C2), (D1), and (D2), a variation of light intensity is detected. This is done by detecting an intensity of the signal transmitted from the corresponding CCD element of the image receiver 28. Then, using the detected intensity variation, a phase of the signal or light intensity is determined for each of the set points.

Note that the phase difference in light intensity at between (B1) and (B2) corresponds to the phase difference of between two points located on the vertical line 70 symmetrically with respect to the sharing axis 68, which phase difference depends only upon the astigmatism, rather than defocusing, spherical aberration, or comma.

Another phase difference in light intensity of between points (A) and (B1) provides no defocusing effect since the points (A) and (B1) are located on the line perpendicular to the sharing direction. Also, since the points (A) and (B1) are positioned on the vertical line 70, the phase difference in light intensity of between them is irrelevant to the second comma component. This means that the phase difference in light intensity of between points (A) and (B1) corresponds to the sum of first comma component in the comma direction and spherical aberration. Note that the distance between points (A) and (B1) is one-half of that between points (B1) and (B2). This in turn means that the phase difference in light intensity of between points (A) and (B1), caused by the astigmatism, is one-half of that between points (B1) and (B2). Therefore, a difference between the phase difference in light intensity of between points (A) and (B1) and one-half of the phase difference in light intensity of between points (B1) and (B2) represents the magnitude of the first comma component in the comma direction.

The phase difference in light intensity of between points (C1) and (C2) is also derived from the astigmatism. Note that, since the points (D1) and (D2) are located symmetrically with respect to the sharing axis 68, the phase difference in light intensity of between them is irrelevant to defocusing, spherical aberration, or first comma component in the comma direction, but is relevant to the second comma component in the direction perpendicular to the comma direction and astigmatism. It should be noted that the distance between points (D1) and (D2) is equal to that between points (C1) and (C2), and therefore the phase difference in light intensity of between points (D1) and (D2), caused by the astigmatism, is the same as that of between points (C1) and (C2). Therefore, a difference of between the phase difference in light intensity of between points (D1) and (D2) and the phase difference in light intensity of between points (C1) and (C2) represents the second comma component in the direction perpendicular to the comma direction.

Accordingly, the magnitudes of first and second comma components are indicated by the following equations (5) and (6):

$$PD1 = |ph(A) - ph(B1)| - |ph(B1) - ph(B2)|/2 \quad (5)$$

$$PD2 = |ph(D1) - ph(D2)| - |ph(C1) - ph(C2)| \quad (6)$$

where:

PD1: First comma component
PD2: Second comma component
ph(A): Phase of light intensity at point A
ph(B1): Phase of light intensity at point B1
ph(B2): Phase of light intensity at point B2
ph(C1): Phase of light intensity at point C1
ph(C2): Phase of light intensity at point C2
ph(D1): Phase of light intensity at point D1
ph(D2): Phase of light intensity at point D2

Also, the comma direction can be determined by the vector analysis using the phase differences of PD1 and PD2.

In view of above, the comma can be evaluated from the phases of the selected points in the shared region of two diffracted images without any need to reconstruct an original wavefront of the shared image.

It should be noted that, although the points (C1) and (C2) are shifted from the points (B1) and (B2), respectively, the points (C1) and (C2) may be located on the points (B1) and (B2), respectively.

Figure 3A:
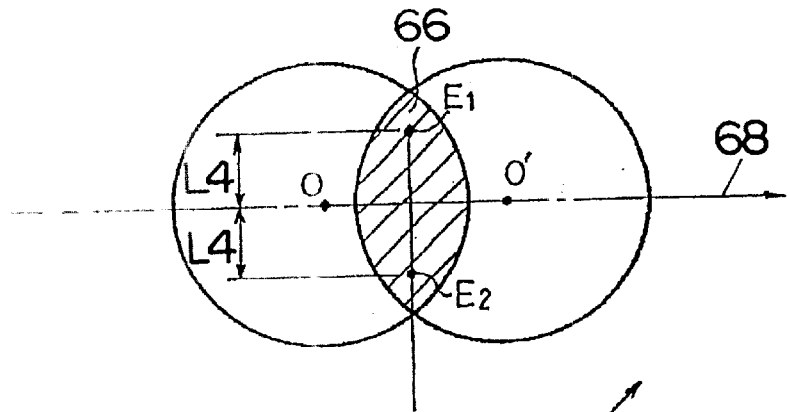
FIGS. 3A to 3C show sharing images of two diffracted lights and points set in a shared region for determining a astigmatism of the optical element.
Figure 3B:
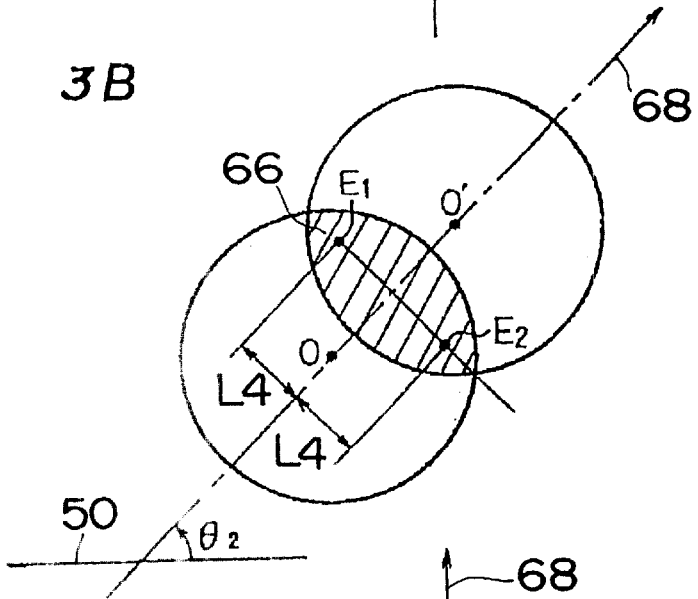
Figure 3C:
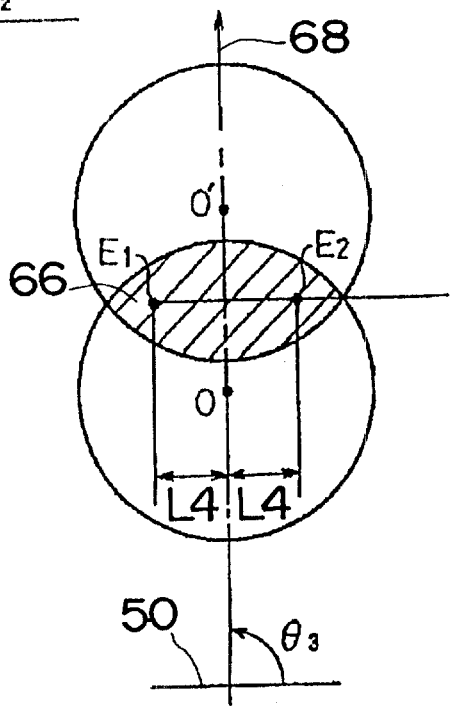

Referring next to FIGS. 3A to 3C, the determination of the astigmatism will be described in detail. Note that FIG. 3A illustrates the sharing image where the sharing axis corresponds to the reference direction in which the grating moves. FIG. 3B illustrates the sharing image of when the sharing axis 68 is turned at a certain angle θ2 (i.e., 0<θ2<90 degrees), while FIG. 2C illustrates another image sharing of when the sharing axis 68 is turned at a right angle θ2 (i.e., 90 degrees), with respect to the reference direction. In these drawings, (E1) and (E2) indicate points on the vertical line 70, located symmetrically with respect to the sharing axis 70 and leaving a certain distance (L7) from the sharing axis 70.

In this instance, then phase difference in light intensity of between points (E1) and (E2) is indicated by the following equation (7):

$$PD_{E1-E2} = |ph(E1) - ph(E2)| \quad (7)$$

where:

$PD_{E1-E2}$: Phase difference in light intensity between points E1 and E2
ph(E1): Phase in light intensity at point E1
ph(E2): Phase of light intensity at point E2

Using this equation, a magnitude of the astigmatism can be determined from two sharing images in different two sharing directions X1 and X2 forming respective angles rather than 90, 180, or 270 degrees with the reference direction, as shown in the following equations (8), (9), and (10):

$$PD_{X1(E1-E2)} = |ph_{X1}(E1) - ph_{X2}(E2)| \quad (8)$$

$$PD_{X2(E1-E2)} = |ph_{X2}(E1) - ph_{X2}(E2)| \quad (9)$$

where:

$PD_{X1(E1-E2)}$: Phase difference between E1/E2 in direction X1

$PD_{X2(E1-E2)}$: Phase difference between E1/E2 in direction X2

$$M_{astigmatism} = PD_{X1(E1-E2)} + PD_{X2(E1-E2)} \quad (10)$$

where:

$M_{astigmatism}$: Magnitude of astigmatism

On the other hand, a direction of astigmatism can be determined by the vector analysis using phase differences obtained from above and following equations, (8), (9), and (11):

$$PD_{X3(E1-E2)} = |ph_{X3}(E1) - ph_{X3}(E2)| \quad (11)$$

where:

$PD_{X3(E1-E2)}$: Phase difference between E1/E2 in direction X3

Note that the three directions X1, X2, and X3 should be determined so that at least one of three angles of between directions X1 and X2, X2 and X3, and X3 and X1 should not be 90, 180, or 270 degrees.

The reason behind that will be described hereinafter. Specifically, each of the phase differences $PD_{X1(E1-E2)}$ and $PD_{X2(E1-E2)}$ includes only astigmatism, rather than defocusing, spherical aberration, or comma. Also, the astigmatism varies with the sharing direction, so that, for example, the sharing in one direction provides no astigmatism but another sharing in another direction perpendicular to the one direction provides the closest interference fringes each extending perpendicular to the sharing direction. This results in that no phase difference occurs in light intensity of between points (E1) and (E2).

This ensures that the phase difference in light intensity of between points (E1) and (E2), caused by the astigmatism, can be determined by selecting two directions defining respective angles rather than 90, 180, or 270 degrees with the reference direction and then sharing the diffracted images with respect to either of two directions. Preferably, the angle may be 45 degrees for eliminating the directional dependency of a detecting result.

If $PD_{X1(E1-E2)}$ and $PD_{X2(E1-E2)}$ determined from equation (8) and (9) with respect to two directions are the same, the third direction X3 extending at the center of between the two directions, X1 and X2, is identified as the direction in which the astigmatism exists or the astigmatism does not exist. Therefore, to identify the direction in which the astigmatism exists, the third sharing direction should be made so that it does not define 90, 180, or 270 degrees with either of the two directions.

Therefore, when determining the three directions, it should be noted that at least one of three directions does not define an angle of rather than 90, 180, or 270 degrees with any one of the remaining two directions. This is because, if the each of the determined three directions would define 90, 180, and/or 270 degrees with any one of the remaining directions, the two of the three sharing directions identify the same sharing direction, which eventually provides only two sharing directions.

With three sharing directions so determined, the sum of two $M_{astigmatism}$S obtained by the equations for two of three sharing directions will lead the magnitude of astigmatism of the lens. In addition, using three phase differences, the vector analysis will determine the direction of the astigmatism. In view of above, the astigmatism of the optical device can be evaluated without determining the original wavefront.

Figure 8:
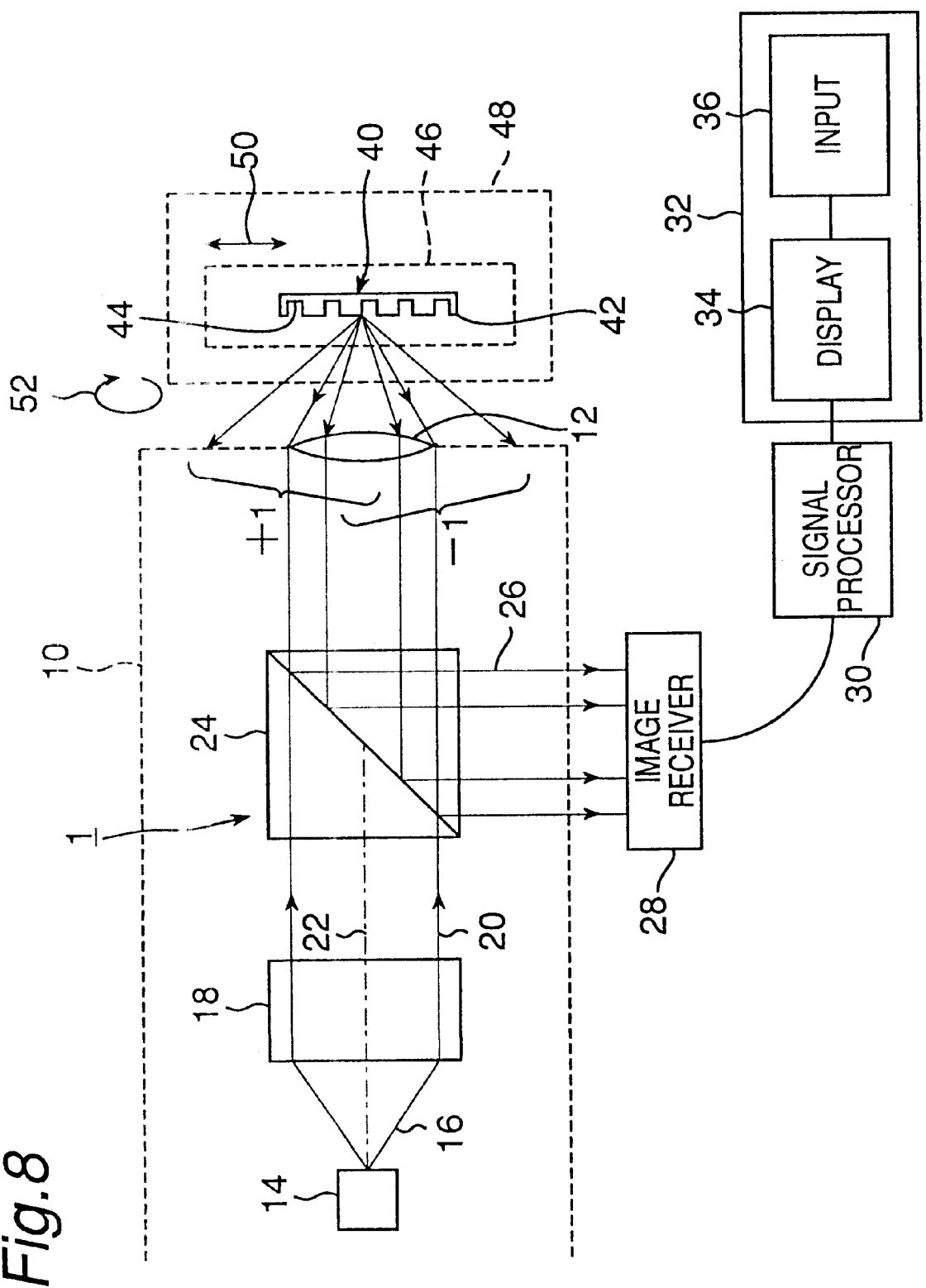
FIG. 8 shows another system for evaluating aberrations of the optical element of another embodiment according to the present invention.
Figure 9:
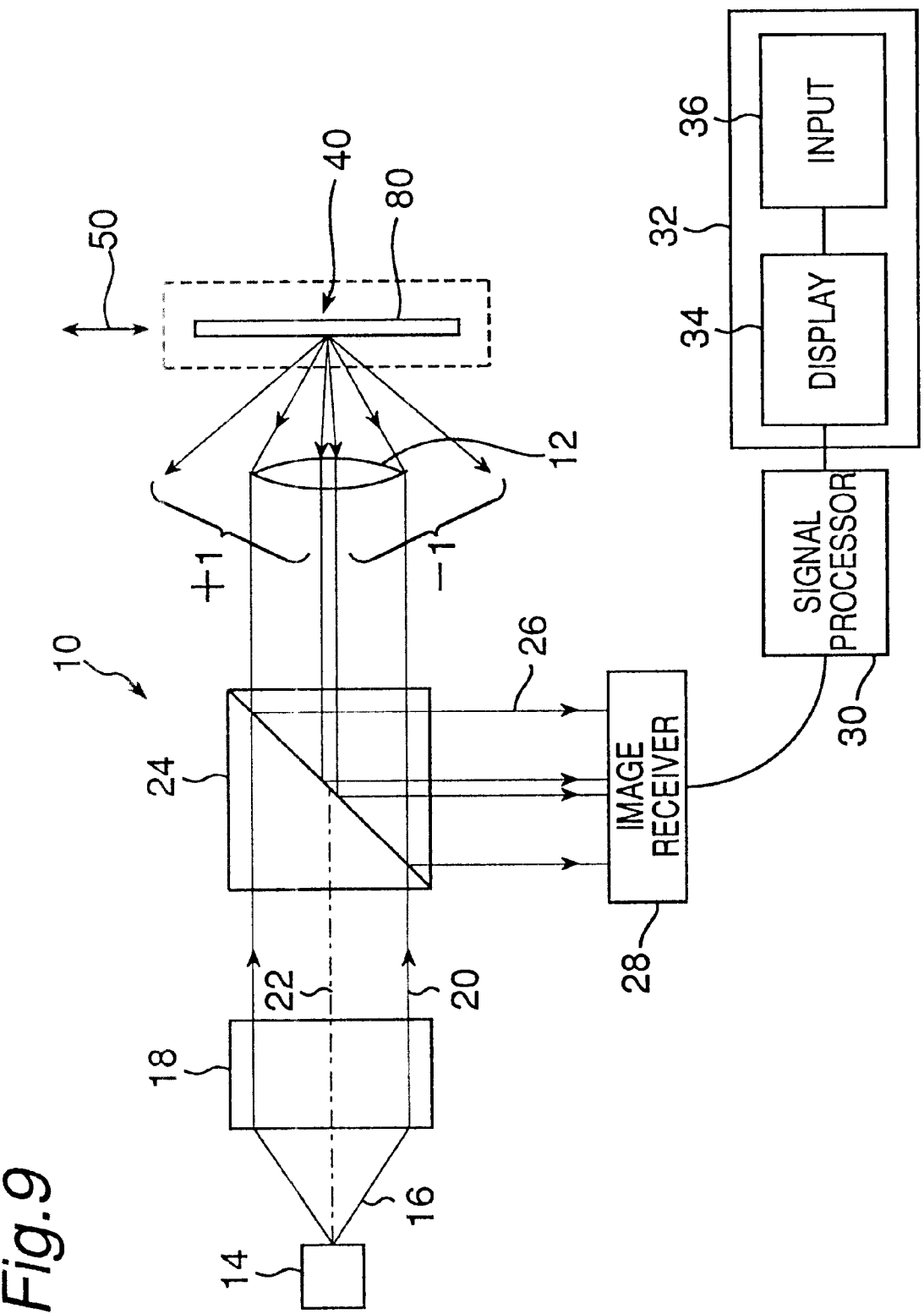
FIG. 9 shows another system for evaluating aberrations of the optical element of according to the present invention.

In the previous embodiment, although 0 and +1 order diffracted lights are used for evaluating the aberrations of the lens, they may be +1 and −1 order diffracted lights or 0 and −1 order diffracted lights (see FIG. 8). Also, three diffracted lights, e.g., 0, +1, and −1 order diffracted lights may be transmitted through the lens 12 so that 0 and +1 order diffracted images and 0 and −1 order diffracted images overlap each other in different areas in the lens 12 (see FIG. 9). In these instances, the spherical aberrations and astigmatism can equally be determined as described above.

Figure 10:
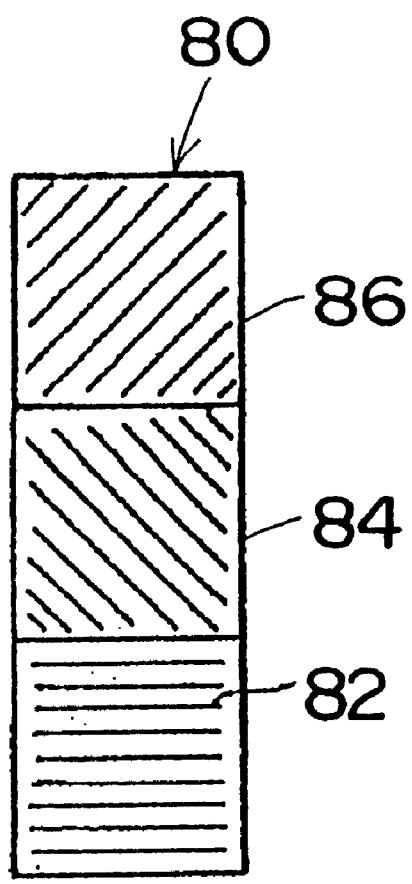
FIG. 10 shows a grating plate which includes three different gratings.

Also, in order to vary the sharing axis with respect to the reference direction, the drive mechanism 48 is equipped with a function to rotate the grating around the optical axis 22 of the lens 12; however, a reflection type of grating plate shown in FIG. 10 may be employed for changing the sharing direction with respect to the reference direction. The grating plate 80 includes three gratings 82, 84, and 86, in each of which a number of grooves are formed in a parallel fashion in different directions. For example, the grooves in the gratings 84 and 86 are angled +45 degrees and −45 degrees to those in the grating 82, respectively. Also, the grating plate 80 is supported so that it moves perpendicular to the reference direction to selectively position any one of three gratings 82 to 86 at the focal point of the lens 12.

(II) SECOND EMBODIMENT

Figure 11:
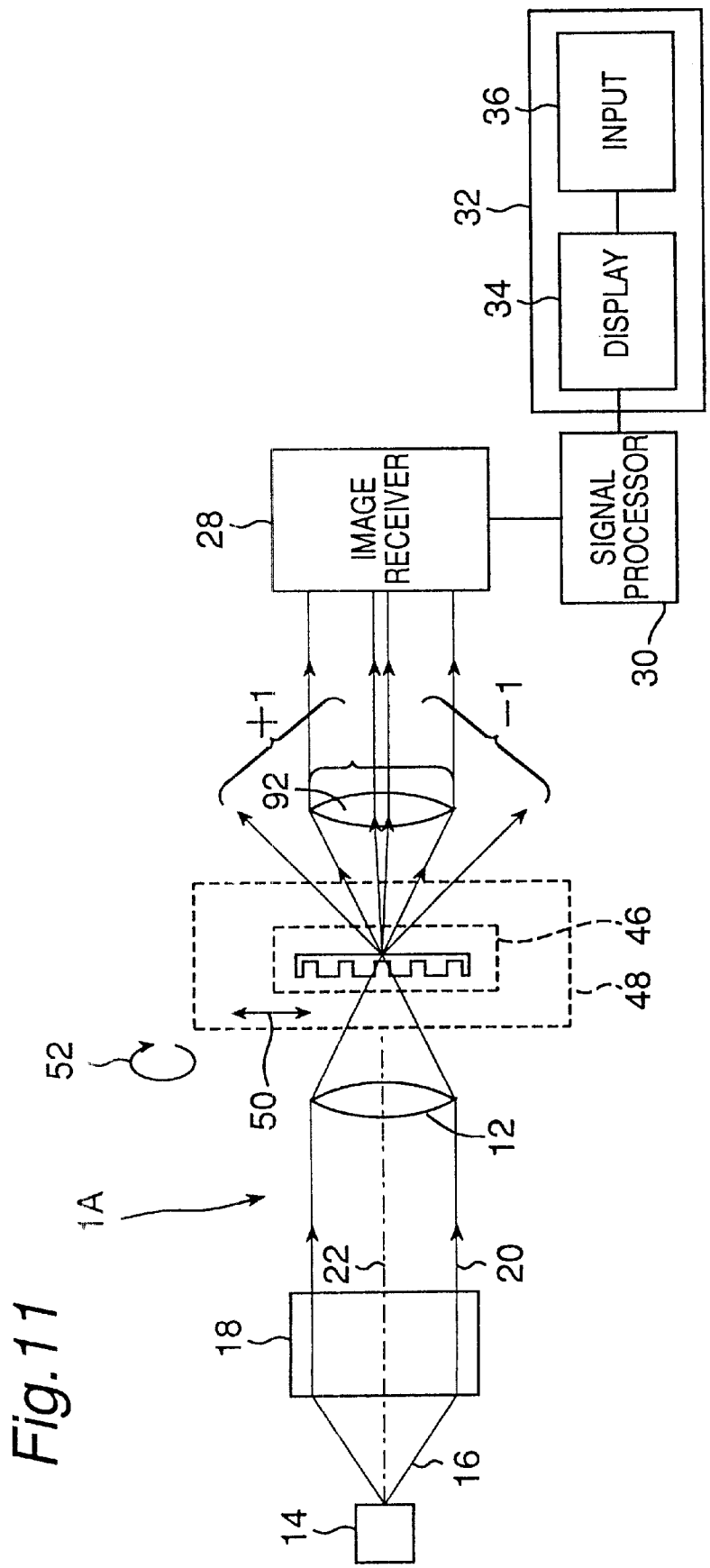
FIG. 11 shows another system for evaluating aberrations of the optical element of according to the present invention.

FIG. 11 shows another system 1A for evaluating the aberrations of the lens. In place of the reflection type of diffraction grating, the system 1A of this embodiment includes a transmission type of diffraction grating. 90 where light from the lens 12 is diffracted into 0, ±1, ±2, . . . order diffraction lights. Provided adjacent to the grating 90 but away from the lens 12 is another lens 92 so that 0 and +1, 0 and −1, +1 and −1, or 0 and ±1 order diffracted lights can travel into the lens 92 and share a part of an opening or pupil of the lens 92. This can be controlled by a diffraction angle of the grating 90, which is determined by a wavelength of the incident light and a pitch or interval of the grooves in the grating 90. The image receiver 28 is positioned so that it received light from the lens 92. Since the transmission grating 90 is used in place of the reflective grating, it is unnecessary to provide a light splitter.

In operation, the grating 90 is moved in the reference direction 50 by the suitable drive mechanism. Light or laser 16 from the light source 14 is transmitted through the modulator 18 and lens 12 and then focused on the grating 90 where it is diffracted into 0, ±1, ±2, . . . order diffraction lights. Among others, 0 and +1, 0 and −1, +1 and −1, or 0 and ±1 order diffracted lights are transmitted through the lens 92 into the image receiver 28. The image receiver 28 generates signals corresponding to the received image and transmits them to the signal processor 30 where they are transformed into image signals with which the received image is displayed on the display 34 in the display unit 32. Then, using the displayed image, various aberrations of the lens are evaluated as described above. In this instance, the sharing direction may be varied by the drive mechanism 48 or by the use of a transmission type of grating plate.

Figure 12:
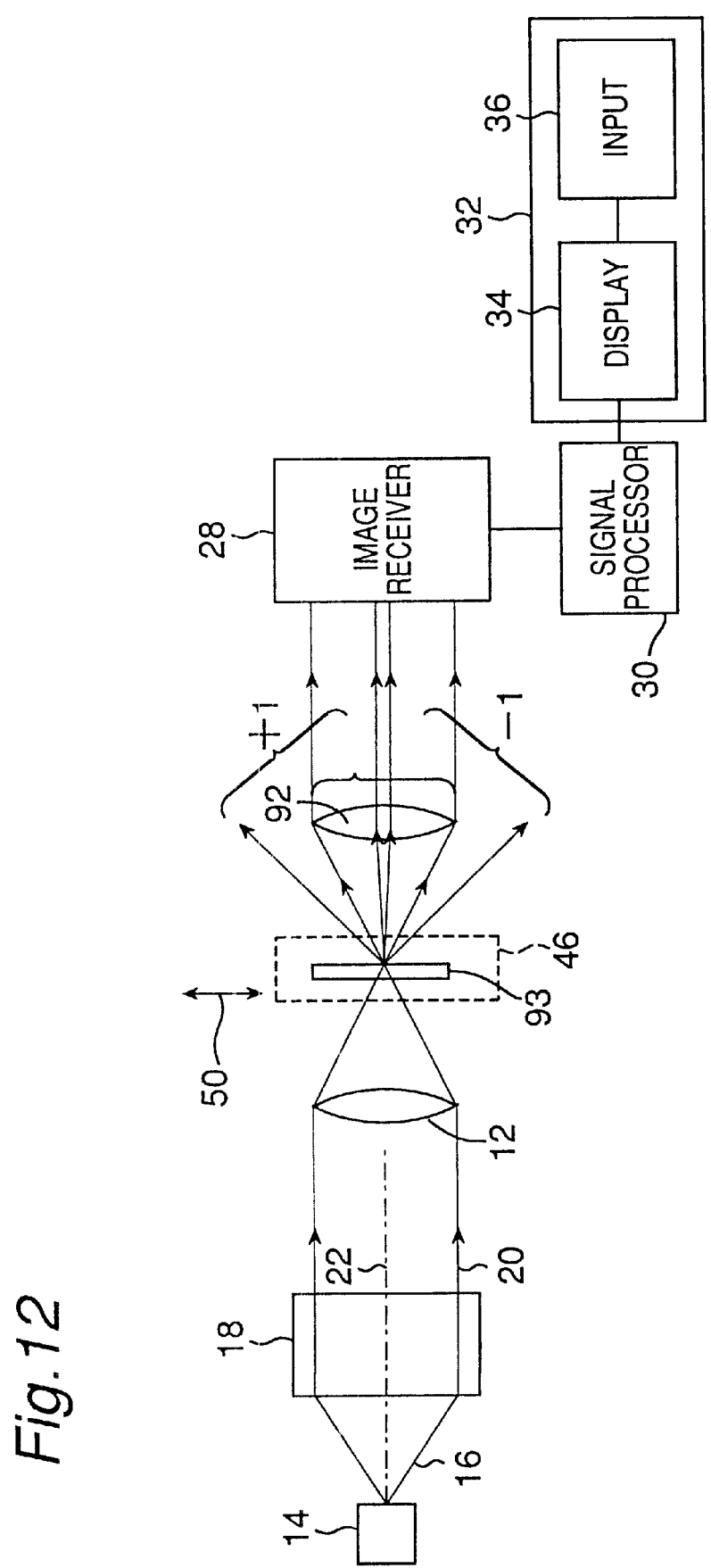
FIG. 12 shows another system for evaluating aberrations of the optical element according to the present invention.

As shown in FIG. 12, a transmission type of grating plate 93 may be used which is similar to the reflection type of grating plate shown in FIG. 10. The transmission type of grating plate 93 has three gratings, in each of which grating a number of slits are formed in a parallel fashion in different directions. For example, the grooves in the second and third gratings are angled at +45 degrees and −45 degrees to those in the first grating, respectively, similar to those in the reflective type of grating plate shown in FIG. 10.

(III) THIRD EMBODIMENT

Figure 13:
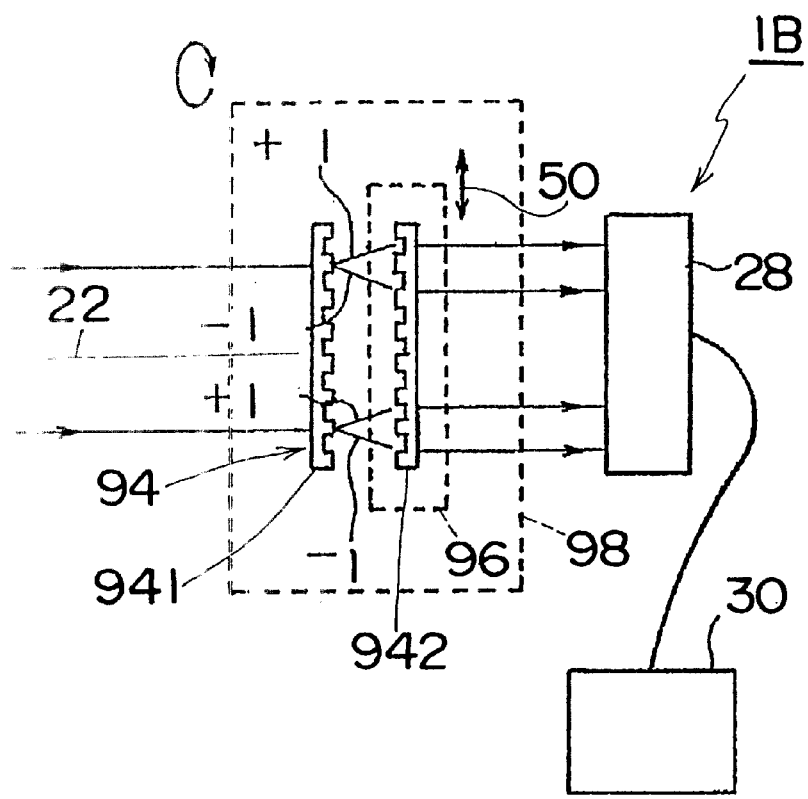
FIG. 13 shows another system for evaluating aberrations of the optical element according to the present invention.

FIG. 13 shows another embodiment of a part of the system 1B which includes a grating unit 94. The grating unit 94 includes a pair of first and second transmission type of diffraction gratings, 941 and 942. Each of the first and second gratings, 941 and 942, is formed with grooves at a certain interval so that it can diffract input light into ±1, ±2, . . . order diffraction lights except for 0 order diffraction light. The first and second gratings, 94 and 96, are positioned in a parallel fashion adjacent to the lens 12 and perpendicular to the optical axis 22 of the lens 12 with their grooves directed in one direction. In addition, the second grating 942 is supported by the support 96 so that it moves in the reference direction 50 perpendicular to the optical axis 22. The first and second gratings, 941 and 942, are supported by the drive mechanism 98 so that they can rotate together about the optical axis 22.

In operation of the system 1B so constructed, the second grating 942 is moved in the reference direction 50, perpendicular to the optical axis 22, while light is transmitted into the lens 12 where it is collimated. The collimated light is then transmitted into the first grating 941 where it is diffracted into ±1, ±2, . . . order diffraction lights. Next, at the second grating 942, each of +1 and −1 order diffracted light again diffracted into ±1, ±2, . . . order diffraction lights.

Note that −1 order diffracted light from the second grating 942, obtained from +1 order diffracted light from the first grating 941, extends parallel to the optical axis 22. Likewise, +1 order diffracted light from the second grating 942, obtained from −1 order diffracted light from the first grating 941, also extends parallel to the optical axis 22. However, +1 and −1 order diffracted lights from the second grating 942, obtained from −1 and +1 order diffracted light from the first grating 941, respectively, are shifted slightly in the direction perpendicular to the optical axis 22 to form a sharing image. The sharing image is then received by the image receiver 28 which is subsequently used for evaluating the aberrations of the lens 12 as described above. Also, the gratings 941 and 942 are simultaneously rotated about the optical axis 22 in order to evaluate the astigmatism.

This arrangement is of great advantage to the system because the optical structure of the system can be simplified considerably.

Figure 14:
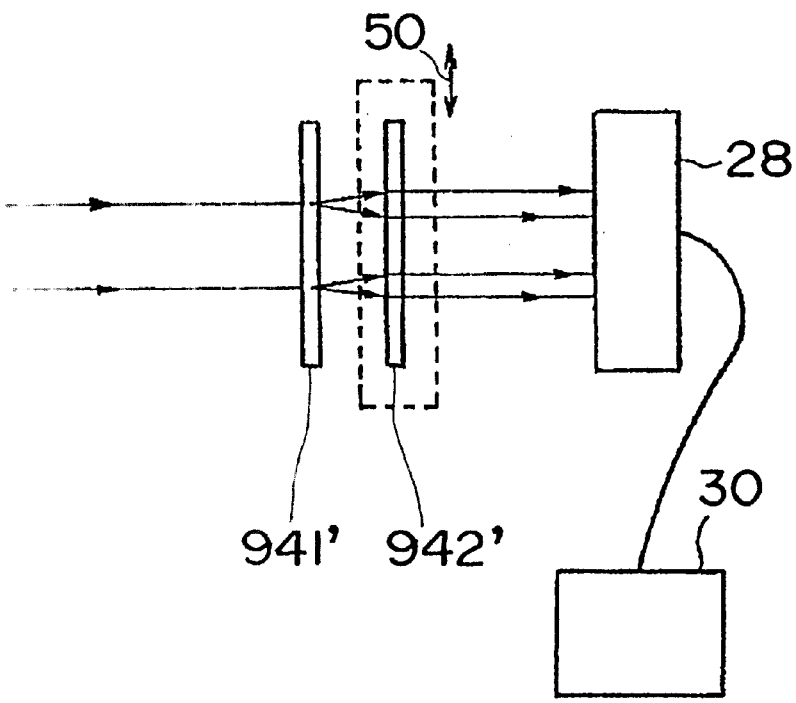
FIG. 14 shows another system for evaluating aberrations of the optical element according to the present invention.

The gratings 941 and 942 are rotated about the optical axis 22 to change directions of the sharing axis; because as shown in FIG. 14 the gratings 941 and 942 may be replaced by the transmission type of grating plate 941' and 942' each of which made of three gratings. In this instance, a mechanism for moving the grating unit is needed for changing gratings.

(IV) FOURTH EMBODIMENT

Figure 15:
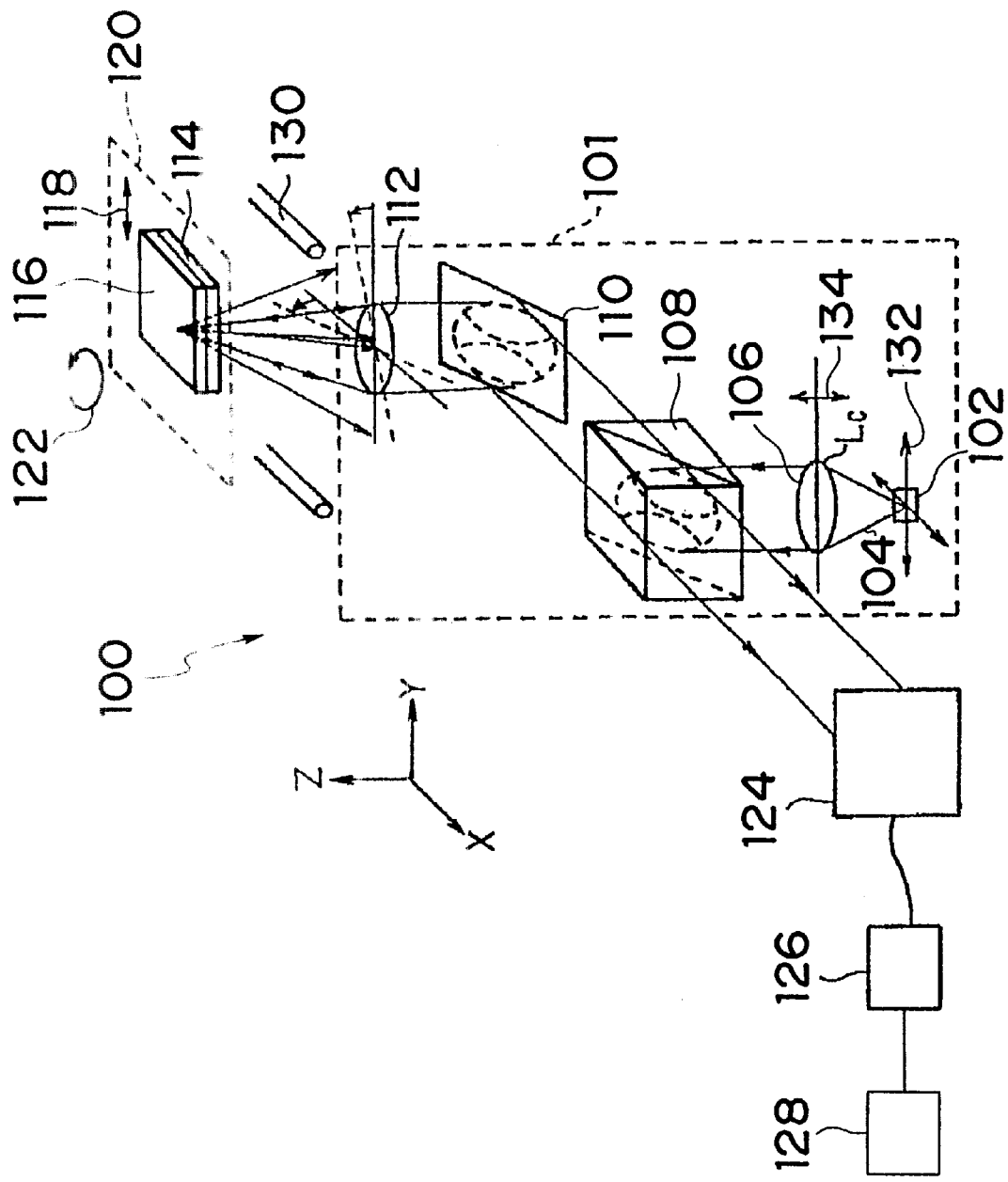
FIG. 15 shows a system for evaluating and correcting aberrations of the optical element according to the present invention.

FIG. 15 shows a system 100 capable of evacuating and then correcting comma and astigmatism of an optical head 101 for use with an optical device such as DVD. The optical head 101 includes a light source 102 such as laser generating device for emitting a light 104 such as laser beam. The emitted light 104 is then collimated by a collimator lens 106. The collimated light 104 is then reflected by a beam splitter 108 and mirror 110 into an objective lens 112 where it is focused through a transparent cover plate 114 on a reflection type of diffraction grating 114. The grating 116 is moved in a direction indicated at 118 by a drive mechanism 120. Also, to evaluate the astigmatism, the grating 116 is rotated in a direction indicated at 122 about an optical axis of the objective lens 112 by the mechanism 120. The diffracted and then reflected light, in particular, 0 and +1 order, 0 and −1 order, or +1 and −1 order diffracted light, are transmitted through the objective lens 112, mirror 110, and beam splitter 108 into a light receiver 124 having small light-receiving-elements in a charge-coupled-device (CCD), each of which transforms the received image into a series of image signals. The image signals are then transmitted to a signal processor 126 where they are processed into image signals of a sharing image to be displayed on a display 128. With the displayed sharing image, the comma and astigmatism of the system are evaluated by the process described above.

In addition, the comma is corrected by controlling an angle of between an axis of the objective lens 112 and the light axis of light from the light source, and/or a position of the light source 102 on an X-Y plane extending perpendicular to the light axis. For this purpose, the objective lens 112 is supported by a mechanism 130 capable of adjusting the angle or inclination of the objective lens 112. Also, the light source 102 is supported by a mechanism 132 for moving its position in the X-Y plane.

The astigmatism, on the other hand, is corrected by moving the collimator lens 106 in its axial direction (i.e., Z direction) to adjust a collimation of the collimated light. For this purpose, the collimator lens 106 is supported by a mechanism 134 capable of moving the collimator lens 106 in the Z direction.

Alternatively, the comma can be controlled by moving the collimator lens 106 in the X-Y plane and/or reflective angles of the optical elements such as beam splitter 108 and mirror 110. Also, the astigmatism can be controlled by moving the light source 102 and/or objective lens 112 in its axial direction, i.e., Z direction, or the position of the beam splitter 108.

In addition, the grating 116 may be replaced by the reflection type of grating plate shown in FIG. 10. In this instance, the grating plate is simply moved perpendicular to the direction 116 for changing sharing direction.

Further, the grating and cover glass may be replaced by a part of an optical disc.

Furthermore, although the cover glass 114 is provided on the grating 116, it may be eliminated. In this instance, the system is designed so that objective lens 112 causes light to suitably focus on the grating 116.

Moreover, the system may be applied to adjust any optical devices such as laser beam recorder (LBR), laser machining device, and laser microscope in which light is formed into a light spot on an object.

(V) FIFTH EMBODIMENT

Figure 16:
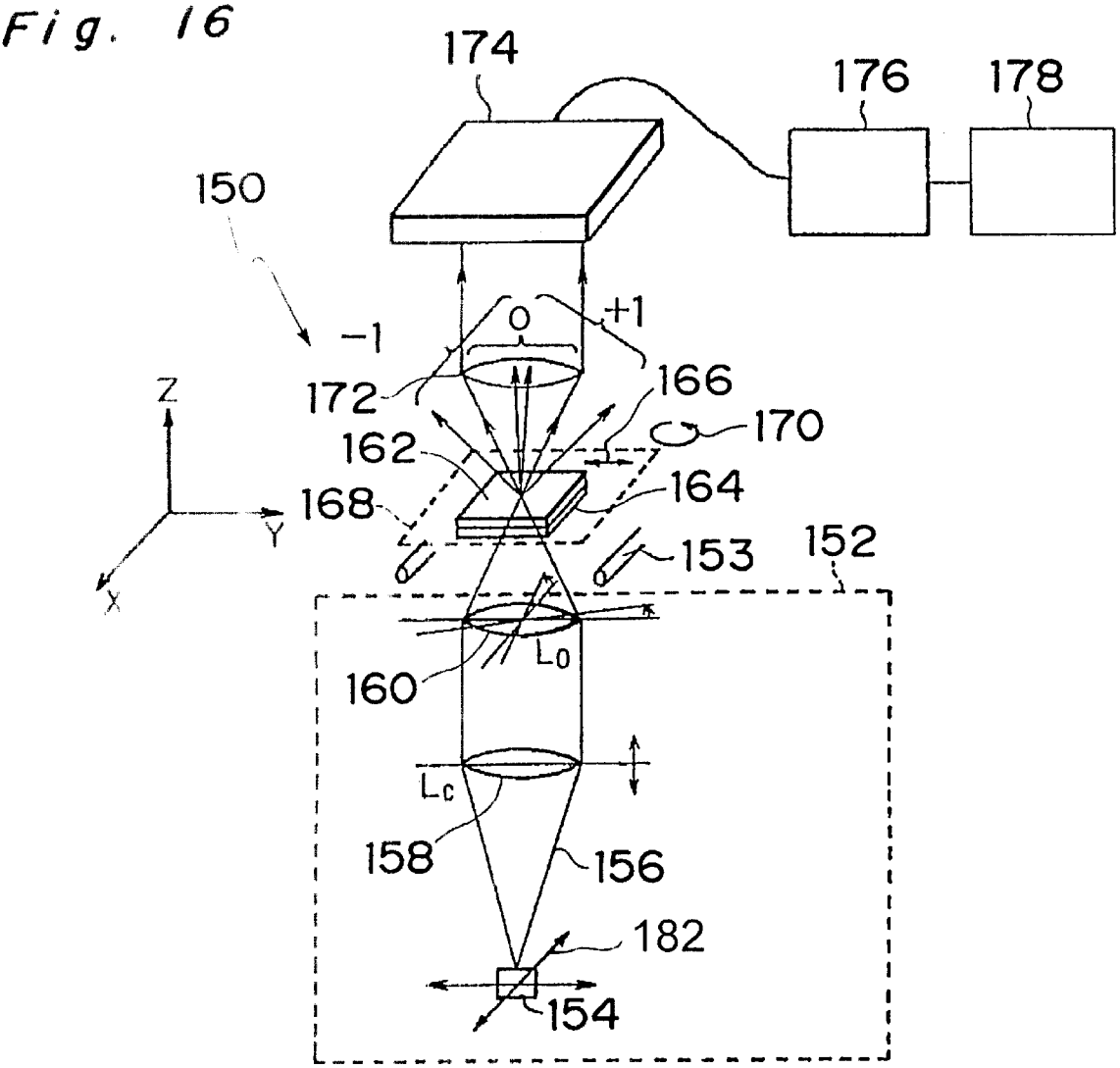
FIG. 16 shows another system for evaluating and correcting aberrations of the optical element according to the present invention.

FIG. 16 shows another system, generally indicated by reference numeral 150, for evaluating and then correcting comma and astigmatism of an optical head 152 for use with an optical device such as DVD. The optical head 152, which is securely supported by a supporting mechanism 153, includes a light source 154 such as laser generating device for emitting light 156 such as laser beam. Also provided are a collimator lens 158 for collimating the emitted light 156 and an objective lens 160 for focusing the collimated light 156 on a transmission type of diffraction grating 162 formed with a number of parallel slits. Alternatively, the grating 162 may be replaced by the transmission type of grating plate. Also, although a transparent cover glass 164 is provided on one surface of the grating 162, it can be eliminated therefrom.

Note that a position of the grating 162 relative to the head 152 is adjusted so that it meets positional requirements needed for the optical head and an optical disk in the product.

The grating 162 is moved in a direction indicated at 166 by a drive mechanism 168. Also, to evaluate the astigmatism, the grating 162 is rotated in a direction indicated at 170 about an optical axis of the objective lens 160 also by the mechanism 168.

The light 156 focused on the grating 162 is diffracted into ±1, ±2, . . . order diffraction light. The diffracted light is then transmitted into another lens 172. In this embodiment, 0 and +1 order or 0 and −1 order diffracted lights are transmitted into the lens 172 as they partially overlap in the lens 172 to form a sharing pattern. The sharing pattern is then caught by an image receiver 174 having small light-receiving-elements in a charge-coupled-device. (CCD), each of which transforms the received image into a series of image signals. The image signals are then transmitted to a signal processor 176 where they are processed into image signals of a sharing image to be displayed on a display 178. Then, using the displayed sharing image, the comma and astigmatism of the head 152 are evaluated by the phase shift method described above.

The comma can be corrected by controlling an angle of the objective lens 160 with respect to the light axis and/or moving the light source 154 in a plane (i.e., X-Y plane) perpendicular to the light axis. To this end, the supporting mechanism 153 supporting the head 152 is designed so that it moves to change the angle of the objective lens 160, and the light source 154 is supported by another mechanism 182 capable of moving the light source 154 in the X and Y directions.

The astigmatism, on the other hand, can be corrected by moving the collimator lens 158 along the light axis and thereby controlling a collimation of the light to be transmitted into the objective lens 160.

(VI) SIXTH EMBODIMENT

Figure 17:
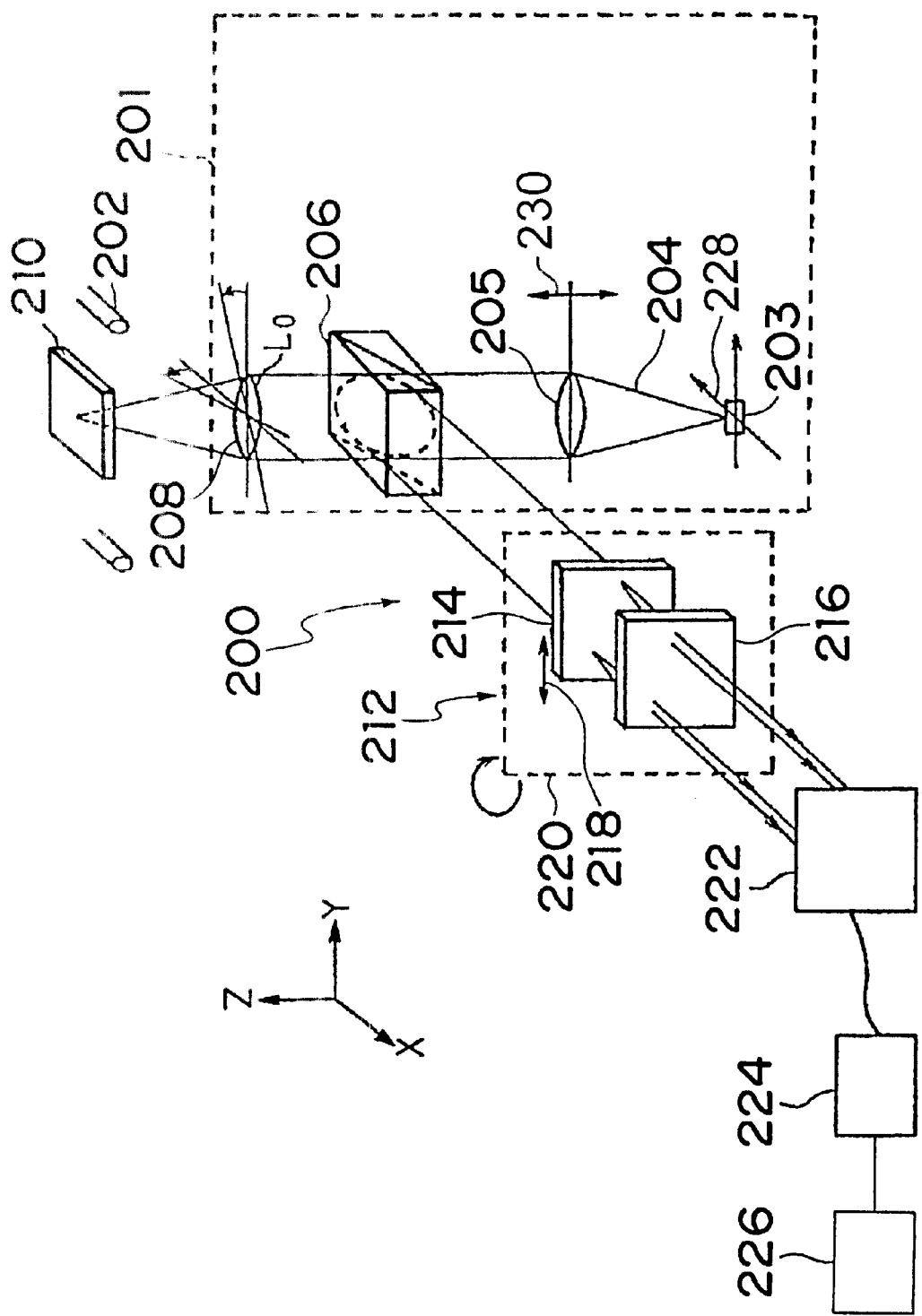
FIG. 17 shows another system for evaluating and correcting aberrations of the optical element according to the present invention.

FIG. 17 shows another system, generally indicated by reference numeral 200, for evaluating and then correcting comma and astigmatism of an optical head 201 for use with an optical device such as DVD. The optical head 201, which is securely supported by a supporting mechanism 202, includes a light source 203 such as laser generating device for emitting a light 204 such as laser beam. Also provided in the head 201 are collimator lens 205, beam splitter 206, and an objective lens 208, so that light 204 emitted from the light source 203 is transmitted through the collimator lens 205 and objective lens 208 and then focused on a mirror 210. Note that a position of the mirror 210 relative to the head 201 is adjusted so that it meets positional requirements needed for an optical disk and the optical head 201 in the actual product. Also, the mirror 210 may be replaced by a part of the optical disk and may be provided at its surface facing to the objective lens 208 with a cover glass.

The light 204 reflected by the mirror 210 is then transmitted through the objective lens 208 and beam splitter 206 and then into a grating unit generally indicated by reference numeral 212. Note that light 204 transmitted into the grating unit 212 is collimated.

The grating unit 212 includes two opposed transmission type of diffraction gratings 214 and 216 positioned in a parallel fashion as shown in FIG. 13. Therefore, the collimated light 204 is diffracted by the first grating into ±1, ±2, . . . order diffraction lights. Each of the diffracted light is again diffracted by the second grating into ±1, ±2, . . . order diffraction lights.

In addition, the first grating 214 is supported by a mechanism 220 to move in a direction indicated at 218 perpendicular to light coming into the grating. Also, the first and second gratings 214 and 216 are supported by the mechanism 220 so that they can rotate about the light axis.

Each of the diffraction gratings 124 and 216 may be replaced by the transmission type of grating plate with three gratings described above. In this instance, the grating plates are moved perpendicular to the optical axis to change gratings.

With the gratings 214 and 216, +1 order diffracted light from the second grating 216, obtained from −1 order diffracted light from the first grating 214, and −1 order diffracted light of the second grating 216, obtained from +1 order diffracted light from the first grating 214, are partially overlapped to form a sharing pattern. Preferably, the gratings and their positions are determined so that the overlapped +1 and −1 order diffracted lights from the second grating 216 travel parallel to each other.

The sharing pattern is then caught by an image receiver 222 having small light-receiving-elements in a charge-coupled-device (CCD), each of which transforms the received image into a series of image signals. The image signals are then transmitted to a signal processor 224 where they are processed into image signals of a sha ring image to be displayed on a display 226. Then, using the displayed sharing image, the comma and astigmatism of the head 201 are evaluated by the phase shift method described above.

The comma can be corrected by controlling an angle of the objective lens 208 with respect to the light axis and/or moving the light source 203 in a plane (i.e., X-Y plane) perpendicular to the light axis. To this end, the supporting mechanism 202 supporting the head 201 is designed so that it moves to change the angle of the objective lens 208, and the light source 203 is supported by another mechanism 228 capable of moving the light source 203 in the X and Y directions.

The astigmatism, on the other hand, can be corrected by moving the collimator lens 205 along the light axis and thereby controlling a collimation of the light to be transmitted into the objective lens 208. To this end, the collimator lens 205 is supported by a mechanism 230 capable of moving the collimator lens 205 to move along the light axis.

(VII) SEVENTH EMBODIMENT

Figure 18:
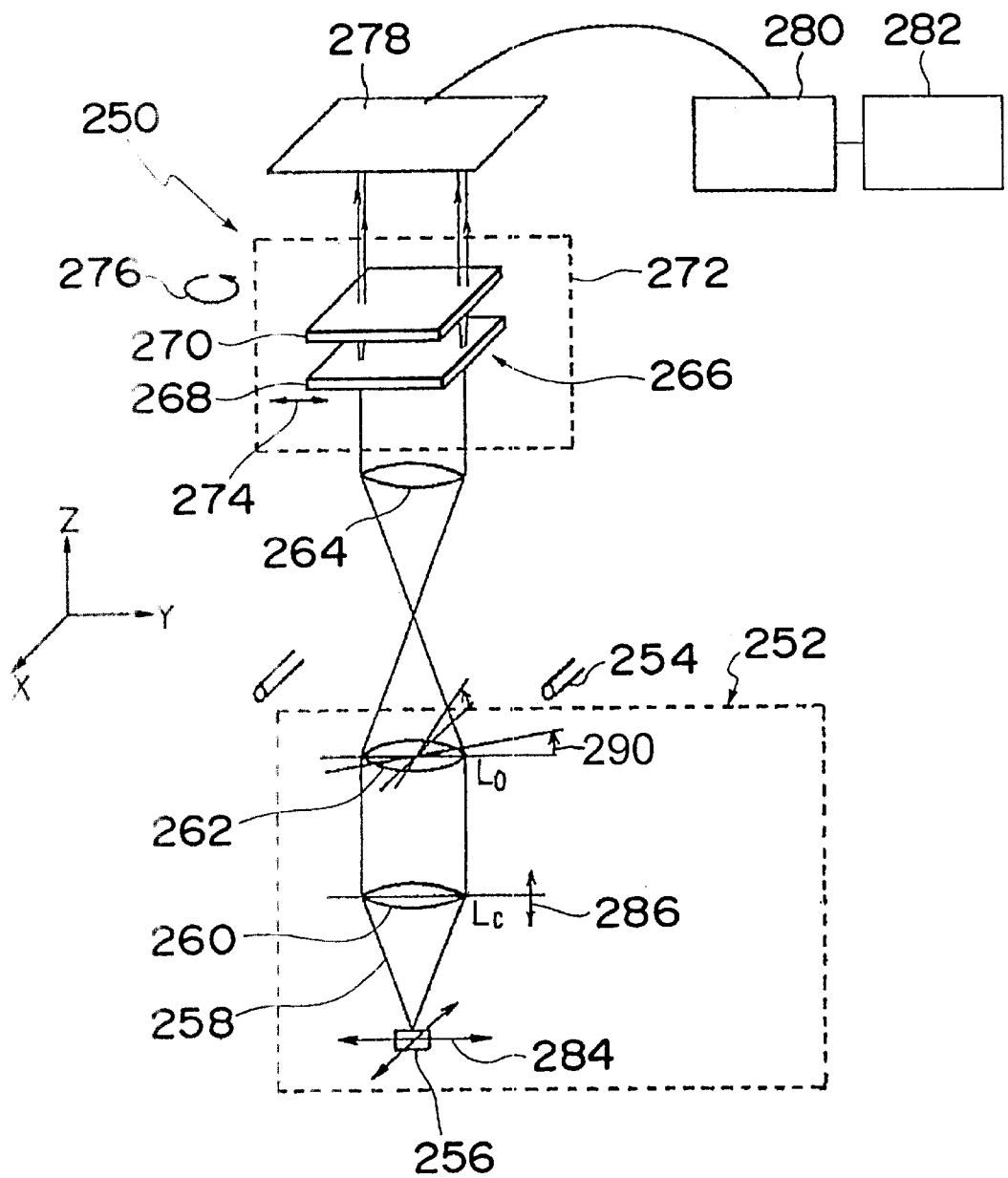
FIG. 18 shows another system for evaluating and correcting aberrations of the optical element according to the present invention.
Figure 19:
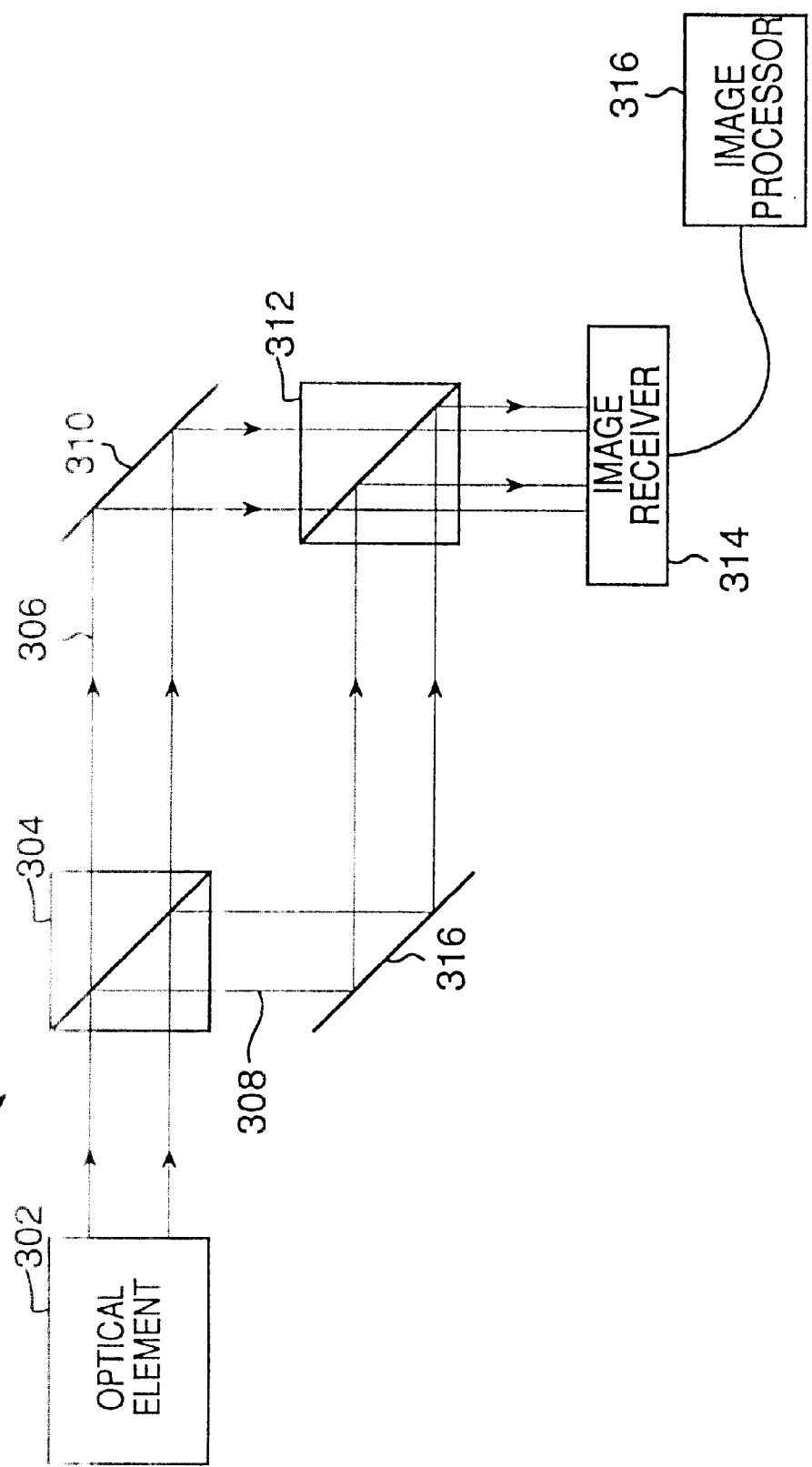
FIG. 19 is a conventional system for evaluating aberrations of the optical element.
Figure 20:
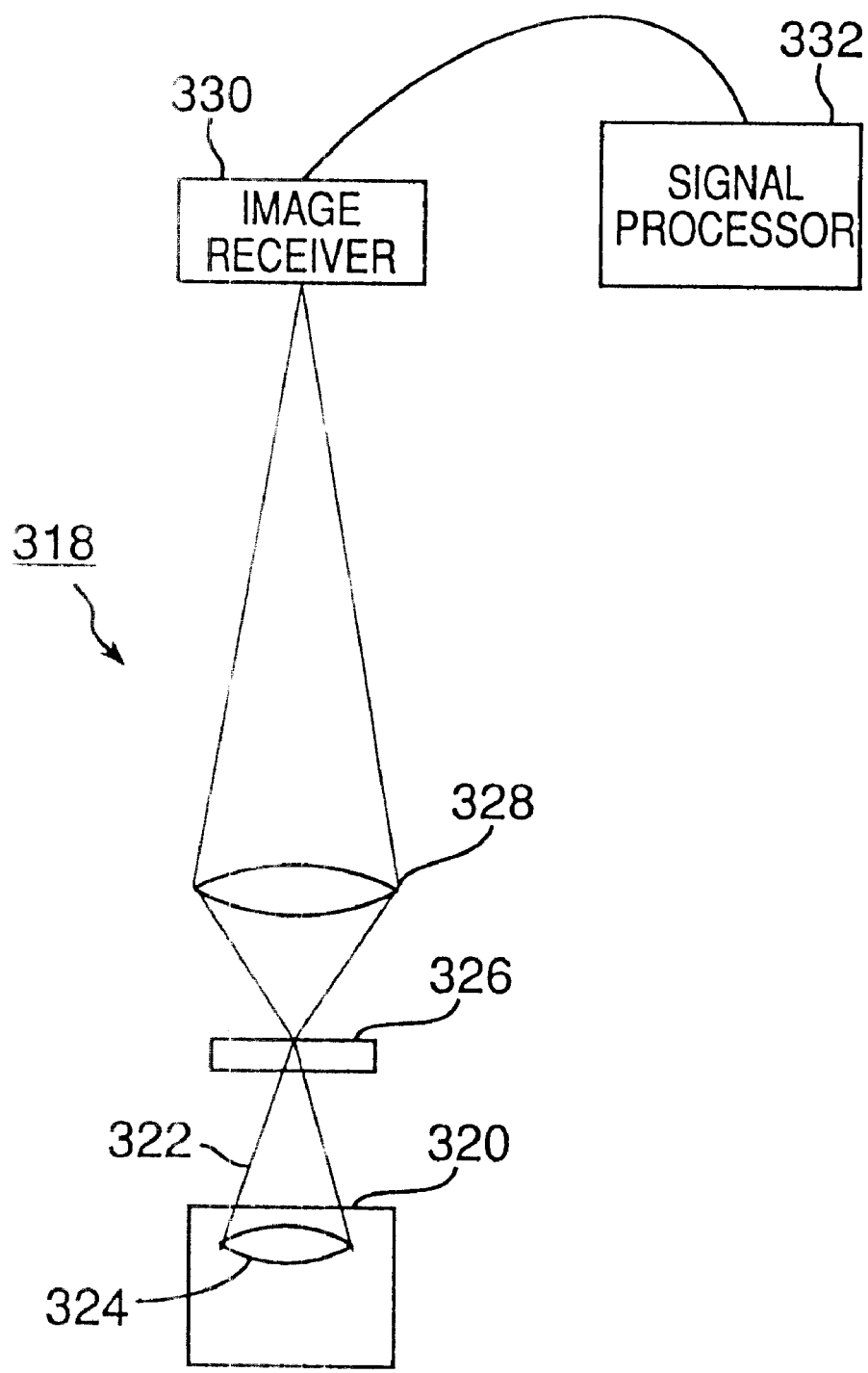
FIG. 20 is another conventional system for evaluating aberrations of the optical element.

FIG. 18 shows another system, generally indicated by reference numeral 250, for evaluating and then correcting comma and astigmatism of an optical head 252 for use with an optical device such as DVD. The optical head 252, which is securely supported by a supporting mechanism 254, includes a light source 256 such as laser generating device for emitting a light 258 such as laser beam. Also provided in the head 252 are collimator lens 260 and an objective lens 262, so that light 258 emitted from the light source 256 is transmitted through the collimator lens 260 and objective lens 262.

The system includes another lens 264 by which the light transmitted from the objective lens 262 is modulated into a collimated light. The collimated light is then transmitted into a grating unit generally indicated by reference numeral 266.

The grating unit 266 includes two opposed transmission type of diffraction gratings 268 and 270 positioned in a parallel fashion as shown in FIG. 13. Therefore, the collimated light. 258 is diffracted by the first grating into ±1, ±2, . . . order diffraction lights. Then, each of the diffracted light is again diffracted by the second grating into ±1, ±2, . . . order diffraction lights.

In addition, the first grating 268 is supported by a mechanism 272 to move in a direction indicated at 274 perpendicular to light coming into the grating. Also, the first and second gratings, 268 and 270, are supported by the mechanism 272 so that they can rotate about the light axis as indicated at 276.

Each of the diffraction gratings 268 and 270 may be replaced by the transmission type of grating plate with three gratings described above. In this instance, the grating plates are moved perpendicular to the optical axis to change gratings.

With two gratings 268 and 270, +1 order diffracted light from the second grating 270, previously obtained from −1 order diffracted light of the first grating 268, and −1 order diffracted light from the second grating 270, previously obtained from +1 order diffracted light of the first grating 268, are partially overlapped to form a sharing pattern. Preferably, the gratings and their positions are determined so that the overlapped +1 and −1 order diffracted lights from the second grating 270 travel parallel to each other.

The sharing pattern is then caught by an image receiver 278 having small light-receiving-elements in a charge-coupled-device (CCD), each of which transforms the received image into a series of image signals. The image signals are then transmitted to a signal processor 280 where they are processed into image signals of a sharing image to be displayed on a display 282. Then, using the displayed sharing image, the comma and astigmatism of the head 252 are evaluated by the phase shift method described above.

The comma can be corrected by controlling an angle of the objective lens 262 with respect to the light axis and/or moving the light source 256 in a plane (i.e., X-Y plane) perpendicular to the light axis. To this end, the head 252 is supported by the mechanism 282 capable of changing the angle of the objective lens 262, and the light source 256 is supported by another mechanism 284 capable of moving the light source 256 in the X and Y directions.

The astigmatism, on the other hand, can be corrected by moving the collimator lens 262 along the light axis and thereby controlling a collimation of the light to be transmitted into the objective lens 262. To this end, the collimator lens 260 is supported by a mechanism 286 capable of moving the collimator lens 260 to move along the light axis.

In view of above, according to the method and apparatus of the present invention, the sharing pattern can be formed with a simple structure. Also, the comma and astigmatism can be evaluated and then corrected by determining phase differences in light intensity of between points in the shared region, rather than determining the original wavefront. Further, it is not necessary to magnify the sharing pattern with a higher magnification and therefore the object image or sharing pattern can easily be positioned within a field of the image receiver, which allows the system to determine the aberrations with a great precision.

What is claimed is:

1. A method for evaluating an aberration of an optical element, said method comprising:

transmitting light through the optical element;

guiding the light from the optical element into a diffraction grating substantially perpendicular to a predetermined axis to obtain a first diffracted light and a second diffracted light;

overlapping the first and second diffracted lights to form a sharing image shared by the first and second diffracted lights;

changing a light intensity at first and second points in the shared image while detecting the light intensity at the first and second points in the shared image;

determining a phase difference in the light intensity between the first and second points;

rotating the diffraction grating about the predetermined axis;

repeating said transmitting operation, said guiding operation, said overlapping operation, said changing operation, and said determining operation; and evaluating the aberration of the optical element by using the determined phase differences.

2. A method for evaluating an aberration of an optical element, said method comprising:

transmitting light through the optical element;

diffracting the light to obtain a first diffracted light and a second diffracted light;

overlapping the first and second diffracted lights to form an image shared by the first and second lights;

determining a plurality of points in the shared image, the plurality of points including a first point which is a mid-center of a first line connecting axes of the first and second diffracted lights, a second point which is located on a second line crossing the first line at the first point, a third point which is located on the second line, the second and third points being positioned symmetrical with respect to the first line, fourth and fifth points which are located on the second line and symmetrical on opposite sides of the first line, each of the fourth and fifth points being spaced a distance from the first line, and sixth and seventh points which are located on opposite sides of the first line, each of the sixth and seventh points being spaced the distance from the first line;

changing a light intensity at the first to seventh points in the shared image while detecting the light intensity at the first to seventh points;

determining a phase in the light intensity at each of the first to seventh points; and evaluating the aberration of the optical element by using the phases at the first to seventh points.

3. The method of claim 2, wherein said evaluating of the aberration comprises:

determining a first phase difference Ph(1) in the light intensity between the first and second points, a second phase difference Ph(2) in the light intensity between the second and third points, a third phase difference Ph(3) in the light intensity between the fourth and fifth points, and a fourth phase difference Ph(4) in the light intensity between the sixth and seventh points;

determining a magnitude of a coma according to a phase difference obtained by an equation:

Phase difference=|Ph(1)|−|Ph(2)|/2; and determining a direction of coma according to a phase difference obtained by another equation:

Phase difference=|Ph(4)|−|Ph(3)|.

4. A method for evaluating an aberration of an optical element, said method comprising:

transmitting light through the optical element;

guiding the light into one of a plurality of gratings respectively located on one of a plurality of regions of a plate to obtain a first diffracted light and a second diffracted light, wherein each of the plurality of gratings has a direction different than a remainder of the plurality of gratings;

overlapping the first and second diffracted lights to form an image shared by the first and second diffracted lights;

changing a light intensity at first and second points in the shared image while detecting the light intensity at the first and second points in the shared image; and determining a phase difference in the light intensity between the first and second points;

repeating said transmitting operation, said guiding operation, said overlapping operation, said changing operation, and said determining operation for each of the plurality of gratings; and evaluating the aberration of the optical element from the phase differences obtained for the plurality of gratings.

5. A method for evaluating an aberration of an optical element, said method comprising:

directing a diffraction grating in one of three directions;

transmitting light through the optical element;

guiding the light into a diffraction grating to obtain a first diffracted light and a second diffracted light;

overlapping the first and second lights to form an image shared by the first and second lights;

changing a light intensity at first and second points in the shared image while detecting the light intensity at the first and second points in the shared image, the first and second points being located on a line crossing a mid-center of another line connecting centers of the first and second diffracted lights and the line being symmetrical with respect to the another line;

determining a phase difference in the light intensity between the first and second points;

repeating said directing operation, said transmitting operation, said guiding operation, said overlapping operation, said changing operation, and said determining operation for each of a remainder of the three directions; and evaluating an astigmatism of the optical element from the phase differences obtained in the three directions.

6. The method of 5, further comprising determining a magnitude of the astigmatism from the phase differences in two of the three directions.

7. An apparatus for evaluating an aberration of an optical element, said apparatus comprising:

a reflection diffraction grating having a plurality of parallel grooves adapted to diffract light from the optical element into a plurality of diffraction lights, the diffraction lights including a first light and a second light partially overlapped to form a shared image;

a mechanism adapted to move said reflection diffraction grating in a direction substantially perpendicular to an axis of the light;

a mechanism adapted to rotate said reflection diffraction grating about the axis of the light;

an image receiver operable to receive the shared image; and a processor operable to determine a phase of a light intensity at each of a plurality of points in the shared image.

8. An apparatus for evaluating an aberration of an optical element, said apparatus comprising:

a transmission diffraction grating having a plurality of parallel slits adapted to diffract light from the optical element into a plurality of diffraction lights, the diffraction lights including a first light and a second light partially overlapped to form a shared image;

a mechanism adapted to move said transmission diffraction grating in a direction substantially perpendicular to an axis of the light;

a mechanism adapted to rotate said transmission diffraction grating about the axis of the light;

an image receiver operable to receive the shared image; and a processor operable to determine a phase of a light intensity at each of a plurality of points in the shared image.

9. An apparatus for evaluating an aberration of an optical element, said apparatus comprising:

a reflection diffraction grating having a plurality of grooves adapted to diffract light from the optical element into a plurality of diffraction lights, the diffraction lights including a first light and a second light partially overlapped to form a shared image, wherein said plurality of grooves in said reflection diffraction grating include a plurality groups of grooves defined in different regions of said reflection diffraction grating, each of said plurality of groups of grooves being directed in a certain direction which is different than any other group of grooves;

a mechanism adapted to move said reflection diffraction grating in a direction substantially perpendicular to an axis of the light;

an image receiver operable to receive the shared image; and a processor operable to determine a phase of a light intensity at each of a plurality of points in the shared image.

10. The apparatus of claim 9, wherein said plurality of groups of grooves in said reflection diffraction grating has first, second and third groups of grooves, said grooves of said second group being angled at +45 degrees with respect to said grooves of said first group and said grooves of said third group being angled at −45 degrees with respect to said grooves of said first group.

11. An apparatus for evaluating an aberration of an optical element, said apparatus comprising:

a transmission diffraction grating having a plurality of slits adapted to diffract light from the optical element into a plurality of diffraction lights, the diffraction lights including a first light and a second light partially overlapped to form a shared image, wherein said plurality of slits in said transmission diffraction grating include a plurality of groups of slits, each of the plurality of groups of slits being directed in a certain direction which is different from any other group of slits;

a mechanism adapted to move said transmission diffraction grating in a direction substantially perpendicular to an axis of the light;

an image receiver operable to receive the shared image;

a mechanism adapted to rotate said transmission diffraction grating about the axis of the light and a processor operable to determine a phase of a light intensity at each of a plurality of points in the shared image.

12. The apparatus of claim 11, wherein said plurality of groups of slits in said transmission diffraction grating has first, second and third groups of slits, said slits of said second group being angled at +45 degrees with respect to said slits of said first group and said slits of said third group being angled at −45 degrees with respect to said slits of said first group.

13. An apparatus for correcting an aberration an optical element, said apparatus comprising:

a reflection diffraction grating having a plurality of parallel grooves so that light from the optical element is diffracted into a plurality of diffraction lights, the diffraction lights including a first light and a second light partially overlapped to form a shared image;

a mechanism adapted to move said reflection diffraction grating in a direction substantially perpendicular to an axis of the light;

an image receiver operable to receive the shared image;

a processor operable to determine a phase of a light intensity at each of a plurality of points in the shared image and then evaluate the aberration of the optical element; and a correction mechanism adapted to correct the aberration of the optical element, said correction mechanism having means for changing an angle of the optical element to the axis of the light.

14. An apparatus of claim 13, further comprising a collimator lens adapted to collimate the light which is guided into the optical element, and wherein said correction mechanism further includes means for moving said collimator lens in a direction parallel to the axis of the light.

15. An apparatus for correcting an aberration an optical element, said apparatus comprising:

a transmission diffraction grating having a plurality of parallel slits adapted to diffract light from the optical element into a plurality of diffraction lights, the diffraction lights including a first light and a second light partially overlapped to form a shared image;

a mechanism adapted to move diffraction grating in a direction substantially perpendicular to an axis of the light;

an image receiver operable to receive the shared image; and a processor operable to determine a phase of a light intensity at each of a plurality of points in the shared image and then evaluate the aberration of the optical element; and a correction mechanism adapted to correct the aberration of the optical element, said correction mechanism having means for changing an angle of the optical element to the axis of the light.

16. An apparatus of claim 15, further comprising a collimator lens adapted to collimate the light which is guided into the optical element, and wherein said correction mechanism further includes means for moving said collimator lens in a direction parallel to the axis of the light.

* * * * *